US011082300B2

(12) United States Patent
Cohn et al.

(10) Patent No.: US 11,082,300 B2
(45) Date of Patent: *Aug. 3, 2021

(54) TRANSFORMING DATA BASED ON A VIRTUAL TOPOLOGY

(71) Applicant: Oracle International Corporation, Redwood Shores, CA (US)

(72) Inventors: Daniel Cohn, Oakland, CA (US); Jagwinder Singh Brar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,524

(22) Filed: May 7, 2020

(65) Prior Publication Data

US 2020/0267056 A1 Aug. 20, 2020

Related U.S. Application Data

(63) Continuation of application No. 15/383,495, filed on Dec. 19, 2016, now Pat. No. 10,693,732, which is a
(Continued)

(51) Int. Cl.
*G06F 15/173* (2006.01)
*H04L 12/24* (2006.01)
*H04L 29/12* (2006.01)

(52) U.S. Cl.
CPC .......... *H04L 41/12* (2013.01); *H04L 61/2514* (2013.01); *H04L 61/2521* (2013.01)

(58) Field of Classification Search
CPC .................................................... H04L 41/12
See application file for complete search history.

(56) References Cited

U.S. PATENT DOCUMENTS

| 7,299,038 B2 | 11/2007 | Kennedy et al. |
| 7,382,765 B2 | 6/2008 | Kennedy et al. |

(Continued)

FOREIGN PATENT DOCUMENTS

| CN | 102857475 A | 1/2013 |
| CN | 103036703 A | 4/2013 |

(Continued)

OTHER PUBLICATIONS

"Comparison of Firewalls," Wikipedia, available at https://en.wikipedia.org/wiki/Comparison_of_firewalls (accessed on May 6, 2016).

(Continued)

*Primary Examiner* — Brian Whipple
*Assistant Examiner* — Gregory P Tolchinsky
(74) *Attorney, Agent, or Firm* — Invoke

(57) ABSTRACT

Techniques for transforming data based on a virtual topology are disclosed. A computer network is associated with a physical topology and a virtual topology. A physical topology is a particular arrangement of digital devices. A virtual topology is a description of a particular arrangement of virtual topology entities (VTEs). VTEs of the virtual topology are instantiated on digital devices of the physical topology. A processing component associated with a particular VTE processes data to perform one or more functions of the particular VTE. An emulation component associated with the particular VTE modifies the data to emulate performance of the functions by the particular VTE.

20 Claims, 11 Drawing Sheets

Related U.S. Application Data continuation-in-part of application No. 15/227,516, filed on Aug. 3, 2016, now abandoned.

(56) References Cited

U.S. PATENT DOCUMENTS

| | | |
|---|---|---|
| 7,453,864 B2 | 11/2008 | Kennedy et al. |
| 7,602,782 B2 | 10/2009 | Doviak et al. |
| 7,813,263 B2 | 10/2010 | Chang et al. |
| 7,953,865 B1 | 5/2011 | Miller et al. |
| 7,958,087 B2 | 6/2011 | Blumenau |
| 8,224,971 B1 | 7/2012 | Miller et al. |
| 8,549,347 B1 | 10/2013 | Brandwine et al. |
| 8,640,220 B1 | 1/2014 | Vincent et al. |
| 9,112,777 B1 | 8/2015 | Barclay et al. |
| 9,274,811 B1 | 3/2016 | Reeves et al. |
| 9,450,817 B1 | 9/2016 | Bahadur et al. |
| 9,602,441 B2 | 3/2017 | Kamble et al. |
| 9,806,948 B2 | 10/2017 | Masurekar et al. |
| 9,825,822 B1 | 11/2017 | Holland |
| 9,952,908 B2 | 4/2018 | Nedeltchev et al. |
| 9,973,390 B2 | 5/2018 | Bhatia et al. |
| 9,979,602 B1 | 5/2018 | Chinnakannan et al. |
| 10,013,170 B1 | 7/2018 | Sahin et al. |
| 10,116,732 B1 | 10/2018 | Canton et al. |
| 10,142,183 B2 | 11/2018 | Cohn et al. |
| 10,218,597 B1 | 2/2019 | Miller et al. |
| 10,291,507 B2 | 5/2019 | Cohn et al. |
| 10,389,628 B2 | 8/2019 | Hill et al. |
| 10,439,882 B2 | 10/2019 | Amin |
| 10,462,013 B2 | 10/2019 | Cohn et al. |
| 10,462,033 B2 | 10/2019 | Cohn et al. |
| 10,693,732 B2 | 6/2020 | Cohn et al. |
| 2003/0189930 A1 | 10/2003 | Terrell et al. |
| 2004/0044758 A1 | 3/2004 | Palmer et al. |
| 2007/0112578 A1 | 5/2007 | Randle et al. |
| 2007/0220203 A1 | 9/2007 | Murase |
| 2009/0182915 A1 | 7/2009 | Farrell et al. |
| 2009/0248896 A1 | 10/2009 | Cohn |
| 2011/0022795 A1 | 1/2011 | Murase |
| 2012/0210066 A1 | 8/2012 | Joshi et al. |
| 2013/0163601 A1 | 6/2013 | Kim et al. |
| 2013/0211870 A1 | 8/2013 | Lawson et al. |
| 2013/0212420 A1 | 8/2013 | Lawson et al. |
| 2013/0218909 A1 | 8/2013 | Chu et al. |
| 2014/0098673 A1 | 4/2014 | Lee et al. |
| 2014/0195689 A1 | 7/2014 | Gill et al. |
| 2014/0207861 A1 | 7/2014 | Brandwine et al. |
| 2014/0207969 A1* | 7/2014 | Benny ............... H04L 41/0803 709/245 |
| 2015/0074450 A1 | 3/2015 | Blount et al. |
| 2015/0085704 A1 | 3/2015 | Kamble et al. |
| 2015/0095448 A1 | 4/2015 | Hwang |
| 2015/0193317 A1 | 7/2015 | Firley |
| 2015/0195137 A1 | 7/2015 | Kashyap et al. |
| 2015/0237117 A1 | 8/2015 | Taylor |
| 2015/0244617 A1 | 8/2015 | Nakil et al. |
| 2015/0304176 A1 | 10/2015 | Ting et al. |
| 2015/0339150 A1 | 11/2015 | Yanagisawa et al. |
| 2015/0379429 A1 | 12/2015 | Lee et al. |
| 2016/0080496 A1 | 3/2016 | Falanga et al. |
| 2016/0094643 A1 | 3/2016 | Jain et al. |
| 2016/0105893 A1 | 4/2016 | Senarath et al. |
| 2016/0112497 A1 | 4/2016 | Koushik et al. |
| 2016/0132214 A1 | 5/2016 | Koushik et al. |
| 2016/0132310 A1 | 5/2016 | Koushik et al. |
| 2016/0134558 A1 | 5/2016 | Steinder et al. |
| 2016/0218918 A1 | 7/2016 | Chu et al. |
| 2016/0234105 A1 | 8/2016 | Li et al. |
| 2016/0323377 A1 | 11/2016 | Einkauf et al. |
| 2016/0330080 A1 | 11/2016 | Bhatia et al. |
| 2016/0364382 A1 | 12/2016 | Sarikaya |
| 2017/0063613 A1 | 3/2017 | Bloch et al. |
| 2017/0180154 A1 | 6/2017 | Duong et al. |
| 2017/0251068 A1 | 8/2017 | Kappler et al. |
| 2017/0264981 A1 | 9/2017 | Wiktor et al. |
| 2017/0302565 A1 | 10/2017 | Ghobadi et al. |
| 2018/0034703 A1* | 2/2018 | Anholt ............... H04L 41/0893 |
| 2018/0041398 A1 | 2/2018 | Cohn et al. |
| 2018/0062932 A1 | 3/2018 | Cohn et al. |
| 2018/0107561 A1 | 4/2018 | Bender et al. |
| 2018/0107563 A1 | 4/2018 | Bender et al. |
| 2018/0139099 A1 | 5/2018 | Amin |
| 2018/0159801 A1 | 6/2018 | Rajan et al. |
| 2018/0205673 A1 | 7/2018 | Jain et al. |
| 2018/0234298 A1 | 8/2018 | Cohn et al. |
| 2018/0234322 A1 | 8/2018 | Cohn et al. |
| 2018/0316594 A1 | 11/2018 | Wu et al. |
| 2019/0182117 A1 | 6/2019 | Bower et al. |
| 2019/0222501 A1 | 7/2019 | Cohn et al. |
| 2019/0289647 A1 | 9/2019 | Li |
| 2019/0363944 A1 | 11/2019 | Cohn et al. |
| 2019/0394095 A1 | 12/2019 | Amin |
| 2020/0259707 A1 | 8/2020 | Cohn et al. |

FOREIGN PATENT DOCUMENTS

| | | |
|---|---|---|
| CN | 102118281 B | 6/2013 |
| CN | 104301321 A | 1/2015 |
| CN | 104518897 A | 4/2015 |
| CN | 104660553 A | 5/2015 |
| CN | 105791288 A | 7/2016 |
| JP | 2012-243254 A | 12/2012 |
| JP | 2015-172964 A | 10/2015 |
| WO | 2017/032251 A1 | 3/2017 |

OTHER PUBLICATIONS

Cavdar, Optical Networks Virtual Topology Design, Optical Networks Lab (ONLab) Royal Institute of Technology, 69 pages, Sep. 2012.

* cited by examiner

TRANSFORMING DATA BASED ON A VIRTUAL TOPOLOGY

PRIORITY CLAIMS; INCORPORATION BY REFERENCE

Each of the following applications are hereby incorporated by reference: application Ser. No. 15/383,495 filed on Dec. 19, 2016; application Ser. No. 15/227,516 filed on Aug. 3, 2016. The Applicant hereby rescinds any disclaimer of claim scope in the parent application(s) or the prosecution history thereof and advises the USPTO that the claims in this application may be broader than any claim in the parent application(s).

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to computer networks. In particular, the present disclosure relates to transforming data based on a virtual topology corresponding to a computer network.

BACKGROUND

A computer network provides connectivity among a set of nodes. The set of nodes are connected by a set of links. The nodes may be local to and/or remote from each other. The nodes are connected by one or more links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Each node performs one or more functions, such as but not limited to routing data, filtering data, inspecting data, processing data, and/or storing data. Each node may be implemented by a function-specific hardware device and/or a generic machine.

Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may provide connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Such a computer network may be referred to as a "cloud network."

A computer network may be shared amongst multiple entities that are independent from each other (also referred to as "tenants" or "customers"). The computer network and the network resources thereof are accessed by clients corresponding to different tenants. Such a computer network may be referred to as a "multi-tenant computer network." Different tenants may demand different network requirements for the computer network. The same computer network may need to implement different network requirements demanded by the different tenants.

An entity, such as an individual or company, may request utilization of a computer network including a particular arrangement of digital devices in order to achieve various security, performance, and/or resiliency goals. As data traverses the particular arrangement of digital devices, the digital devices perform respective functions associated with the data. As an example, a security goal of a computer network may be to filter out spam mail. A digital device performing a mail filtering function may be included in the computer network. The digital device may be configured for filtering mail received by the computer network. The digital device may inspect the incoming mail to determine whether the incoming mail includes any spam mail. The digital device filters out the spam mail while forwarding the remaining mail to destinations within the computer network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
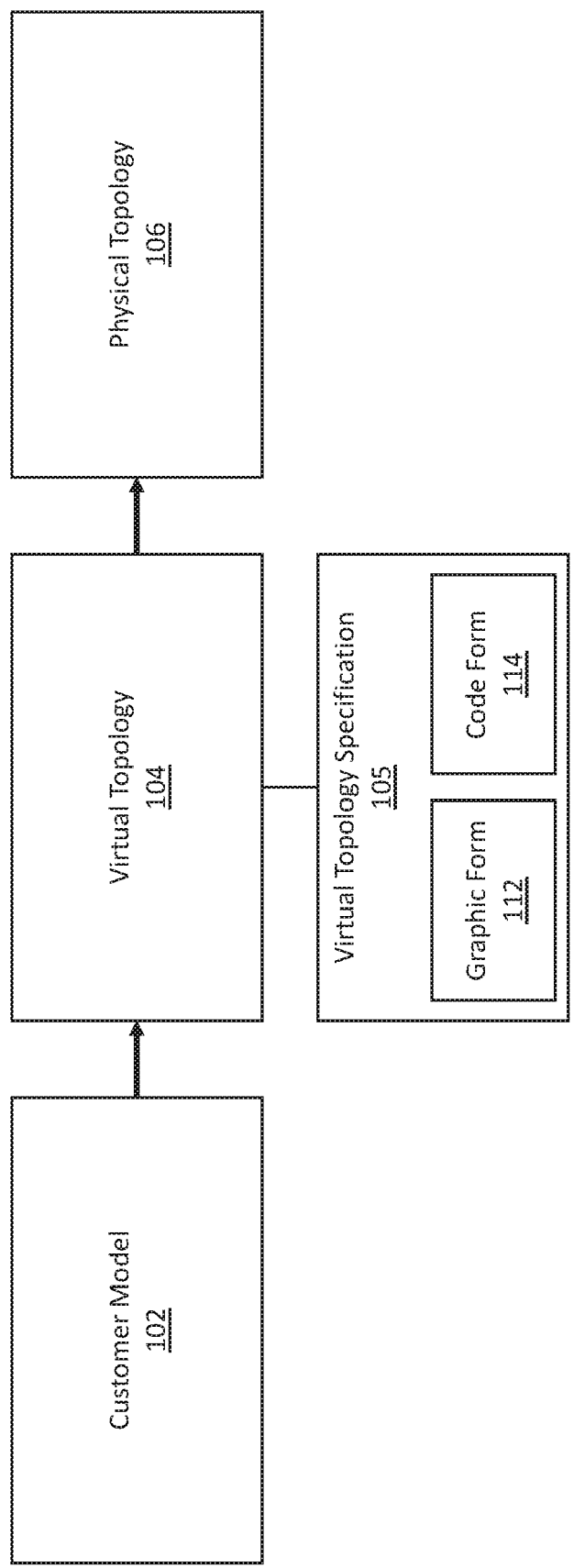
FIG. 1 illustrates relationships between a customer model, a virtual topology, and a physical topology, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PHYSICAL TOPOLOGIES AND VIRTUAL TOPOLOGIES
3. DATA TRANSFORMATION SYSTEM ARCHITECTURE
4. TRANSFORMING DATA BASED ON A VIRTUAL TOPOLOGY
5. EXAMPLE EMBODIMENTS
6. COMPUTER NETWORKS
7. MISCELLANEOUS; EXTENSIONS
8. HARDWARE OVERVIEW

1. General Overview

In one or more embodiments, a computer network is implemented in accordance with a virtual topology that is instantiated on a physical topology.

A physical topology is a particular arrangement of digital devices, such as function-specific hardware devices and/or generic machines.

A virtual topology is a particular arrangement of virtual topology entities (VTEs). Each VTE is associated with one or more functions. Examples of functions include data routing, data filtering, data inspection, data storage, and/or any other type of data processing function.

A virtual topology is instantiated on a physical topology based on a virtual topology specification. During instantiation, VTEs of a virtual topology specification are mapped to digital devices of a physical topology. A VTE may correspond to a digital device itself, or a virtual component executing on the digital device. A single VTE may be mapped to multiple digital devices. Conversely, multiple VTEs may be mapped to a single digital device. A particular digital device mapped to a particular VTE implements the functions corresponding to the particular VTE. The virtual topology specification may but does not necessarily include any reference to a physical topology or digital devices therein. The virtual topology specification may but does not necessarily specify which digital devices of the physical topology perform which functions of which VTEs.

Multiple computer networks, implemented in accordance with respective virtual topologies, may be instantiated on a single physical topology. As an example, multiple tenants may share a set of digital devices, which are arranged according to a physical topology. Each tenant may have a different desired arrangement of VTEs. Each arrangement of VTEs corresponds to a different virtual topology. Each virtual topology, of the respective tenants, may be instantiated on the physical topology.

One or more embodiments include transforming data based on a virtual topology. A digital device of a physical topology transforms the data in order to emulate performance of a function by a VTE of a virtual topology. Transforming the data includes (a) processing the data to perform the function of the VTE and (b) in addition to and separately from processing the data, modifying the data to emulate performance of the function by the VTE. In an embodiment, modifying the data to emulate performance of the function by the VTE may be a separate operation from the actual performance of the function. As an example, a VTE may be configured to perform a firewall function. Processing the data to perform the firewall function may include inspecting the data and routing the data based on the inspection. Modifying the data to emulate performance of the firewall function may include marking a tag associated with the data to indicate that the firewall function has been performed. Processing the data to perform the function of the VTE and modifying the data to emulate performance of the function by the VTE are further described below.

Processing the data to perform the function of the VTE may include various processes, depending on the specific function of the VTE. As an example, a particular VTE is a firewall. A digital device, corresponding to the VTE, may perform the firewall function by analyzing the data to determine whether to allow the data into the computer network. As another example, a VTE is a router. A digital device, corresponding to the VTE, may perform the routing function by identifying one or more virtual destinations for the data and transmitting the data to the destinations over virtual infrastructure.

Modifying the data to emulate performance of the function by the VTE may include modifying the metadata corresponding to the data. The metadata may include a time-to-live (TTL) value, a source identifier, a destination identifier, security tags, a Source Virtual Network Identifier, a Source Tenant Identifier, a Destination Network Identifier, a Destination Tenant Identifier, and/or other tags associated with the data. As an example, a digital device emulating performance of a function by a particular VTE may modify an identifier associated with the data. The identifier, corresponding to a last component that processed the data, may be modified to reference the particular VTE, rather than the digital device. As another example, a digital device emulating performance of functions by two VTEs may decrease a TTL value of the data by two (2). The TTL value would reflect the number of VTEs traversed that would be traversed in the virtual topology, rather than the actual number of digital devices traversed in a physical topology.

One or more embodiments described in this Specification and/or recited in the claims may not be included in this General Overview section.

2. Physical Topologies and Virtual Topologies

FIG. 1 illustrates relationships between a customer model 102, a virtual topology 104, and a physical topology 106, in accordance with one or more embodiments.

In one or more embodiments, physical topology 106 includes a particular arrangement of digital devices of a computer network. Digital devices include function-specific hardware devices and/or generic machines. An example of physical topology 106 is discussed below with reference to FIG. 3.

The term "digital device" generally refers to any hardware device that includes a processor. Examples of digital devices include a computer, a tablet, a laptop, a desktop, a netbook, a server, a web server, a network policy server, a proxy server, a generic machine, a hardware router, a hardware switch, a hardware firewall, a hardware firewall, a hardware network address translator (NAT), a hardware load balancer, a function-specific hardware device, a mainframe, a television, a content receiver, a set-top box, a printer, a mobile handset, a smartphone, and a personal digital assistant (PDA).

In an embodiment, the digital devices of a physical topology 106 form a computer network that provides connectivity between clients and network resources. Network resources include hardware and/or software configured to execute server processes. Examples of network resources include a processor, a data storage, a virtual machine, a container, and/or a software application. Network resources are shared amongst multiple clients. Such a computer network may be referred to as a "cloud network."

Additionally, the digital devices of a physical topology 106 form a computer network that is shared amongst multiple tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, and/or tenant isolation. As an example, Best Bank may require that all emails pass through a particular firewall before entering a computer network that processes the data of Best Bank. State Security Agency may require that address translation be applied to all data entering a computer network that processes the data of State Security Agency. The same computer network may need to implement different network requirements demanded by different tenants. A multi-tenant computing network may also be an off-premise computer network, as the computer network may be implemented at a location that is away from the premises of the tenants served by the computer network.

Additional embodiments and/or examples relating to Computer Networks are described below in Section 6, titled "Computer Networks."

In one or more embodiments, a customer model 102 includes a particular arrangement of components of a computer network that is requested by a customer. The computer network may be an on-premise network of the customer and/or a private network of the customer. A customer model 102 may correspond to a computer network that is implemented by the customer and/or a customer's design of a computer network. A customer may request a particular customer model 102 in order to satisfy network requirements as well as security, performance, behavioral, and/or resiliency goals. As an example, a customer model may include (a) a primary server and (b) a backup server that duplicates the primary server. The backup server may replace the primary server in the event a failure occurs with the primary server. The customer model includes the duplicated servers to increase a level of resiliency of the computer network.

In an embodiment, a customer model 102 may include an arrangement of digital devices that is unnecessarily duplicative and/or inefficient. The efficiencies may be a result of the constraints imposed by the physical nature of customer model 102. As an example, a physical design may include specification of each redundant paired component and corresponding interconnections. The physical design may specify that the redundant paired components are horizontally scaled according to a particular heuristic. The physical design may include specification of each scaled element and corresponding interconnections. The specification of redundant elements may give rise to inefficiencies.

In an embodiment, a customer may request implementation of a customer model 102 on a multi-tenant computer network. Implementation of the customer model 102 may include migrating a computer network already implemented by the customer onto the multi-tenant computer network. However, the customer model 102 may have no relationship to the physical topology 106 of the multi-tenant computer network. The customer model 102 and the physical topology 106 of the multi-tenant computer network may include different components and/or a different arrangement of the components. As explained in further detail below, the customer model 102 may be used to determine a virtual topology specification 105, which is used to instantiate with a virtual topology 104 on a physical topology 106.

In one or more embodiments, a virtual topology 104 includes a particular arrangement of virtual topology entities (VTEs). Each VTE is associated with one or more functions. The function may be implemented in order to satisfy network requirements and/or improve security, resiliency, and/or performance levels. Examples of functions performed by VTEs include but are not limited to the ability to:

(a) Routing and/or forwarding data to a next hop;
(b) Filtering and/or rejecting data based on a criterion;
(c) Inspecting data for security issues and/or other issues;
(d) Hiding and/or modifying a source address and/or destination address of data;
(e) Distributing data to resources based on availability of resources;
(f) Compressing data;
(g) Caching data;
(h) Storing data; and
(i) Processing data.

A VTE associated with a particular function may operate as a particular type of virtual component and/or physical component. Examples of VTEs include but are not limited to a gateway, a router, a switch, a hub, a proxy, a firewall, an intrusion detection system (IDS), a network address translator (NAT), a load balancer, and a network optimizer.

As an example, a VTE may filter data based on a set of security rules specified by a user (such as, a network administrator). The VTE may reject data based on the contents of the Internet Protocol (IP) and Transport headers of the data. The VTE may operate as an IP firewall. Other VTEs may filter data based on other characteristics of the data, such as the contents corresponding to the application layer of the data. These other VTEs may operate as firewalls of different types.

As another example, a VTE may monitor data for offline analysis of security anomalies. Offline analysis means that the analysis is performed after a decision to allow or reject data has already been made (this decision may be made by a firewall). Offline analysis allows the VTE to perform more complex inspection of the data than the firewall. The VTE may operate as an IDS.

As another example, a VTE may replace the source address and/or destination address of the data. The VTE may operate as a NAT. In some cases, multiple client devices within a particular Local Area Network (LAN) may share a single external or public IP address. The client devices may be assigned private IP addresses. A particular client device may transmit data to an external network outside of the LAN via a NAT. The source address of the data may be the private IP address of the particular client device. The NAT may replace the source address with the public IP address (used for outbound communication from all client devices in the LAN) prior to transmitting the data to the external network.

As another example, a VTE may serve as a single point of entry to multiple services. The VTE may forward service requests to a particular component based on the load of the components in the computer network. The VTE may operate as a load balancer.

As another example, a VTE may perform various functions to improve latency, bandwidth consumption, and/or other performance parameters of a computer network. The VTE may eliminate the transfer of redundant data. The VTE may perform compression and/or caching. The VTE may set an upper limit on the amount of data that may be transmitted by a particular client device over a particular time period. The VTE may operate as a network optimizer.

In one or more embodiments, virtual topology specification 105 is a description of a virtual topology 104. A virtual topology specification 105 describes the functions of each TE in a virtual topology 104. A virtual topology specification 105 may but does not necessarily include any reference to a physical topology 106 and/or digital devices therein. A virtual topology specification 105 may but does not necessarily specify which digital devices of a physical topology 106 perform which functions of which VTEs. The description of the particular arrangement of VTEs may be provided in various forms, such as graphic form 112 and/or code form 114.

A graphic form 112 of a virtual topology specification 105 may include a graph of the VTEs, such as the graph illustrated in FIG. 2, described below. A graphic form 112 may be specified by user input via a user interface. As an example, a user interface may include drag-and-drop functionality. A user may drag-and-drop a particular VTE to a particular location of a graph presented on the user interface. The user may connect the particular VTE to other VTEs already shown on the graph. The user may configure each VTE through the user interface. Based on the user input, the particular arrangement of the VTE in relation to the other VTEs already shown on the graph is specified.

A code form 114 of a virtual topology specification 105 may include lines of code, commands, or other textual descriptions of the particular arrangement of VTEs. As an example, a particular line of code may specify a name and/or function of a particular VTE. Another line of code may specify a particular arrangement of various VTEs. Code form 114 may be expressed in any computing language, such as XML (Extensible Markup Language), JSON (JavaScript Object Notation), YAML, Java, C++, C, C #, and Python.

In an embodiment, a virtual topology specification 105 includes a description of one or more forwarding policies. A forwarding policy specifies reachability between VTEs. The forwarding policy determines a next hop for a data packet based upon a destination prefix of the data packet and/or other metadata. Other metadata may include a port from which the data packet was received, or a hash value of a particular field of the data packet. The forwarding policy may be applied to Layer 3 transport protocols and/or Layer 2 transport protocols.

A forwarding policy may specify intermediate VTEs to be traversed between a particular VTE and a related VTE. As an example, there may be multiple paths between a source VTE and a destination VTE. One path may include the source VTE, VTE A, and the destination VTE. Another path may include the source VTE, VTE B, and the destination VTE. A forwarding policy may specify that for a data packet coming from the source VTE and destined for the destination VTE, the next hop is VTE A. Hence, a data packet would traverse the path including VTE A, instead of the path including VTE B.

A forwarding policy may specify filtering criteria for data packets transmitted between two VTEs. As an example, VTEs of a virtual topology may include two subnetworks. A forwarding policy may specify that data packets transmitted between the two subnetworks must first pass through a particular firewall. As another example, VTEs of a virtual topology may e 111 include two subnetworks. A forwarding policy may specify that data packets addressed to a particular address within one of the subnetworks must be dropped.

A forwarding policy applicable to a particular relationship corresponding to a particular VTE may also be applicable to another relationship corresponding to the particular VTE. The forwarding policy is applicable to the other relationship if the other relationship depends on the particular relationship.

As an example, a virtual topology may include a relationship between VTE A and VTE B (also referred to as the "VTE A-VTE B relationship"). The VTE A-VTE B relationship may include a forwarding policy requiring that data transmitted between VTE A and VTE B first pass through a firewall VTE. Additionally, the virtual topology may include a relationship between VTE B and VTE C (also referred to as the "VTE B-VTE C relationship"). The VTE B-VTE C relationship may include a forwarding policy that allows all data to be transmitted directly between VTE B and VTE C.

In this example, the VTE A-VTE B relationship and the VTE B-VTE C relationship provides reachability between VTE A and VTE C. VTE A may transmit data to VTE C by first transmitting the data to VTE B, which then forwards the data to VTE C. Hence, the relationship between VTE A and VTE C (also referred to as the "VTE A-VTE C relationship") depends on the VTE A-VTE B relationship.

Continuing this example, VTE A may transmit data to VTE C through VTE B. As the data is transmitted from VTE A to VTE B, the forwarding policy associated with the VTE A-VTE B relationship may be applied. Based on the forwarding policy, VTE A may transmit the data to the firewall VTE. If the data passes the filtering policy of the firewall VTE, then the firewall VTE may transmit the data to VTE B. VTE B may transmit the data to VTE C. In this example, the forwarding policy applicable to the VTE A-VTE B relationship is applicable to the VTE A-VTE C relationship. This example illustrates the transitive nature of forwarding policies with respect to the relationships corresponding to a VTE.

In an embodiment, a virtual topology 104 serves as an intermediary state between customer model 102 and physical topology 106. A virtual topology 104 may be a modified and/or simplified version of a customer model 102, while still satisfying the network requirements and/or goals of the customer model 102. In some cases, as described above, a customer model 102 may include various inefficiencies. As an example, a customer model may include redundant paired firewalls in a physical design. A virtual topology may include a single firewall. The single firewall is a VTE in the virtual topology. The virtual topology is specified with the assumption of resiliency. Resiliency is achieved by the nature of the virtual topology. If the VTE implementing the firewall functionality fails, then a new VTE configured to implement the firewall functionality is instantiated. In this example, the virtual topology describes a simplified version of the customer model, while maintaining the firewall functionality of the customer model.

Additionally, a virtual topology 104 may be instantiated on physical topology 106. During instantiation, VTEs of the virtual topology are mapped to digital devices of the physical topologies. A single VTE may be mapped to multiple digital devices. Conversely, multiple VTEs may be mapped to a single digital device. A particular digital device mapped to a particular VTE implements the functions corresponding to the particular VTE.

Multiple virtual topologies 104 may be instantiated by a single physical topology 106. As an example, multiple tenants may share a set of digital devices corresponding to a physical topology. Meanwhile, each tenant may desire a different arrangement of VTEs for implementing a computer network that satisfies the tenant's particular network requirements. A different virtual topology may be required for each tenant. The same set of digital devices may be used to instantiate the multiple different virtual topologies.

Additional embodiments and/or examples relating to instantiation of virtual topology 104 on physical topology 106 are described below with reference to FIGS. 4A-4B.

2.1 An Example of a Virtual Topology

Figure 2:
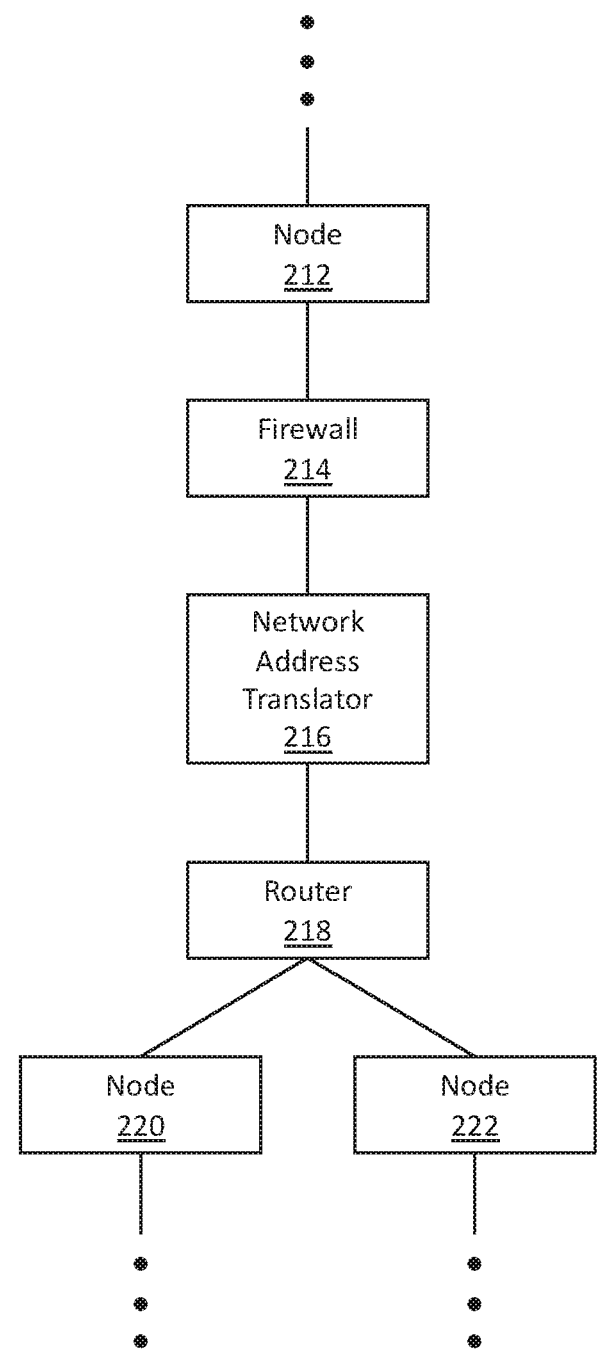
FIG. 2 illustrates an example of a virtual topology specification, in accordance with one or more embodiments.

FIG. 2 illustrates an example of a virtual topology specification, in accordance with one or more embodiments. As illustrated, virtual topology specification 200 includes various VTEs, including node 212, firewall 214, network address translator (NAT) 216, router 218, node 220, and node 222. Virtual topology specification 200 may include more or fewer VTEs than the VTEs illustrated in FIG. 2. Each VTE is represented as a box. A connection between the VTEs is represented by a line.

In an embodiment, virtual topology specification 200 may be generated by a user submitting user input via a user interface. As an example, the user may be a representative of a customer (e.g., company with data being stored/processed by a cloud network), or a representative of a third party company implementing the computer network. The user may drag-and-drop a VTE to a particular location on a graph presented by the user interface. The user may label the VTE as "node 212." The user may drop-and-drop another VTE to another location on the graph. The user may label the VTE as "firewall 214." The user may add a line connecting node 212 and firewall 214. The user may further specify the functions performed by node 212 and firewall 214.

Example virtual topology specification 200 specifies how data is supposed to traverse through the VTEs. Data is supposed to traverse through the VTEs according to the connections linking the VTEs. As illustrated, for example, data may be transmitted from node 212 to node 220 by traversing through firewall 214, NAT 216, and router 218. At firewall 214, the data may be processed to perform a firewall functionality associated with firewall 214. Based on the firewall functionality, the data may be inspected to determine whether to allow the data to pass through. Additionally, at NAT 216, the data may be processed to perform a NAT functionality associated with NAT 216. Based on the NAT functionality, the source address and/or destination address of the data may be modified. Additionally, at router 218, the data may be processed to perform the routing functionality of router 218. Based on the routing functionality, the next hop of the data may be identified as node 220. Router 218 may forward the data to node 220.

2.2 An Example of a Physical Topology

Figure 3:
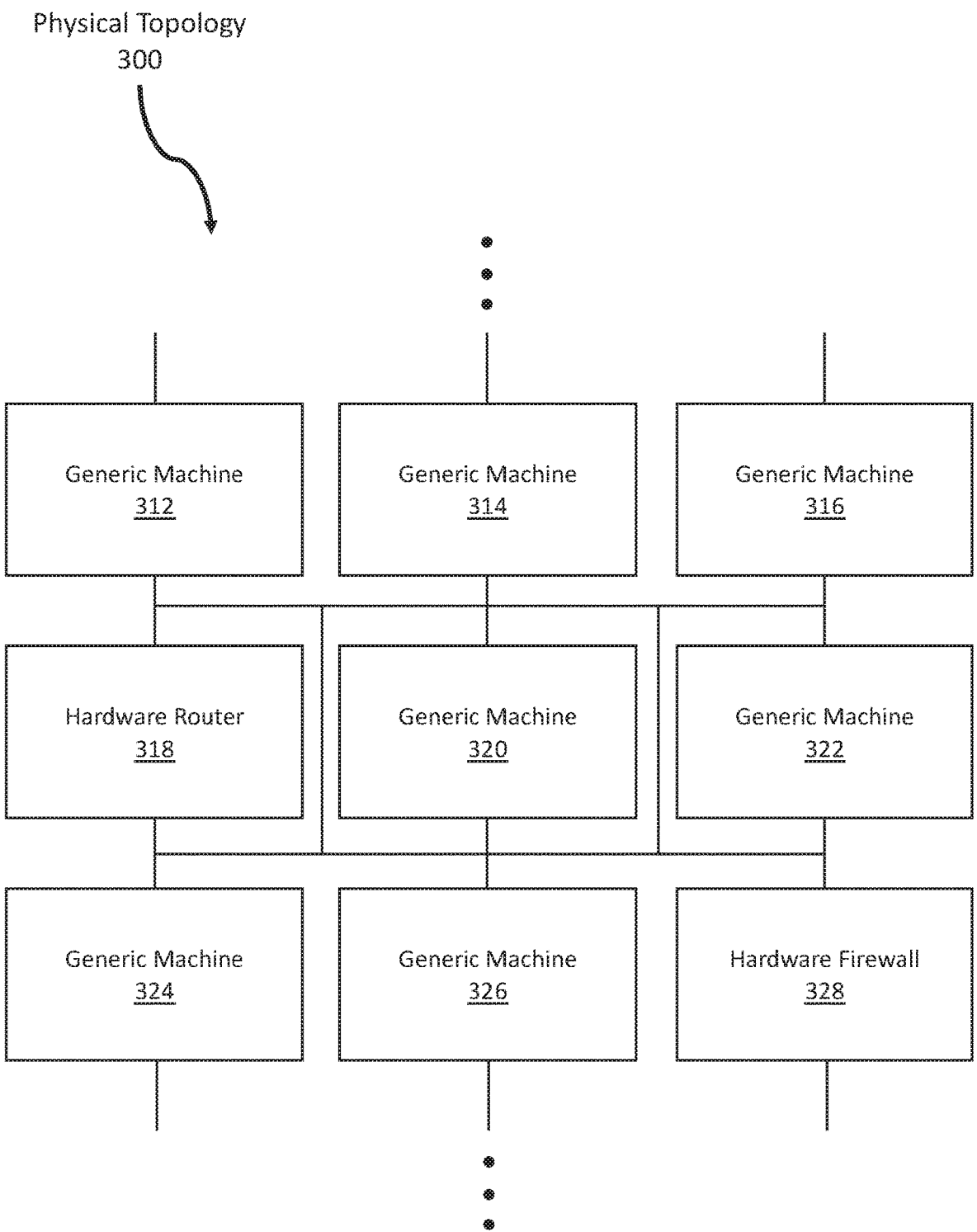
FIG. 3 illustrates an example of a physical topology, in accordance with one or more embodiments.

FIG. 3 illustrates an example of a physical topology, in accordance with one or more embodiments. As illustrated, physical topology 300 includes various digital devices, including generic machines 312-316 and 320-326, hardware router 318, and hardware firewall 328. Physical topology 300 may include more or fewer digital devices than the digital devices illustrated in FIG. 3. Each digital device is represented as a box. Each digital device may be connected to any number of one or more other digital devices within physical topology 300. The digital devices may be located in a single geographical location or distributed across various geographical locations.

In an embodiment, physical topology 300 may correspond to a cloud network. The digital devices shown in physical topology 300 may be shared amongst multiple client devices and/or tenants. A particular digital device may perform a same function for different client devices and/or tenants. A particular digital device may perform different functions for different client devices and/or tenants.

2.3 Instantiation of a Virtual Topology on a Physical Topology

There may be multiple ways to instantiate a virtual topology, described by a same virtual topology specification, on a physical topology. Instantiation of a virtual topology on a physical topology 300 includes mapping VTEs described in a virtual topology specification to digital devices of the physical topology 300.

VTEs in a virtual topology may be executed in an overlay network. The overlay network is implemented on top of an underlay network corresponding to the physical topology. Each VTE is associated with two addresses: (a) an overlay address corresponding to the VTE and (b) an underlay address corresponding to the digital device on which the VTE is instantiated. The addresses may be fixed (for example, entered by a network administrator). Additionally or alternatively, the addresses may be dynamically assigned (for example, by a Dynamic Host Configuration Protocol (DHCP) and/or another application). Data is transmitted between VTEs in a virtual topology by tunneling through the underlying network. Tunneling is further described below with reference to FIG. 4A.

Figure 4A:
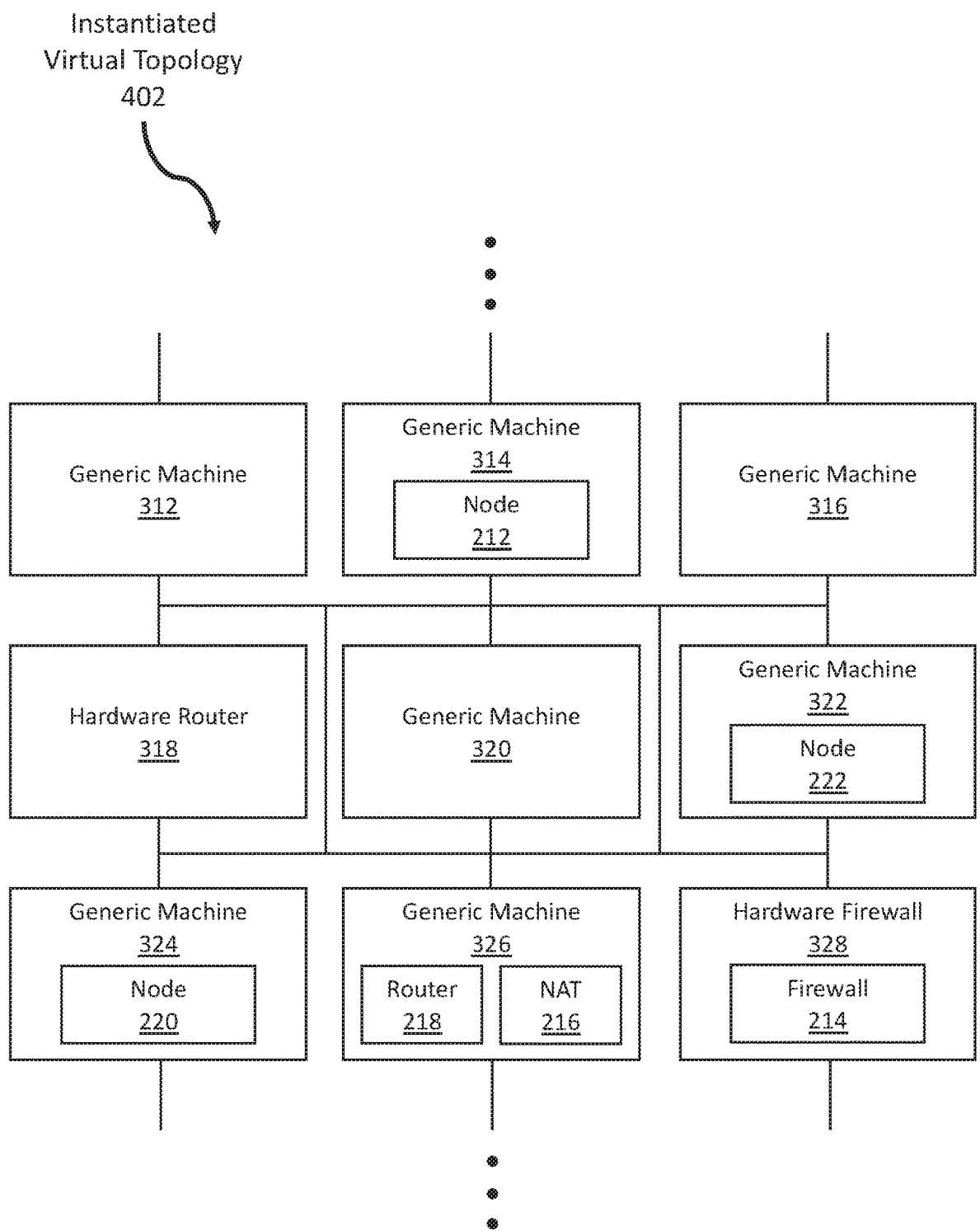
FIGS. 4A-4B illustrate examples of an instantiated virtual topology, in accordance with one or more embodiments.
Figure 4B:
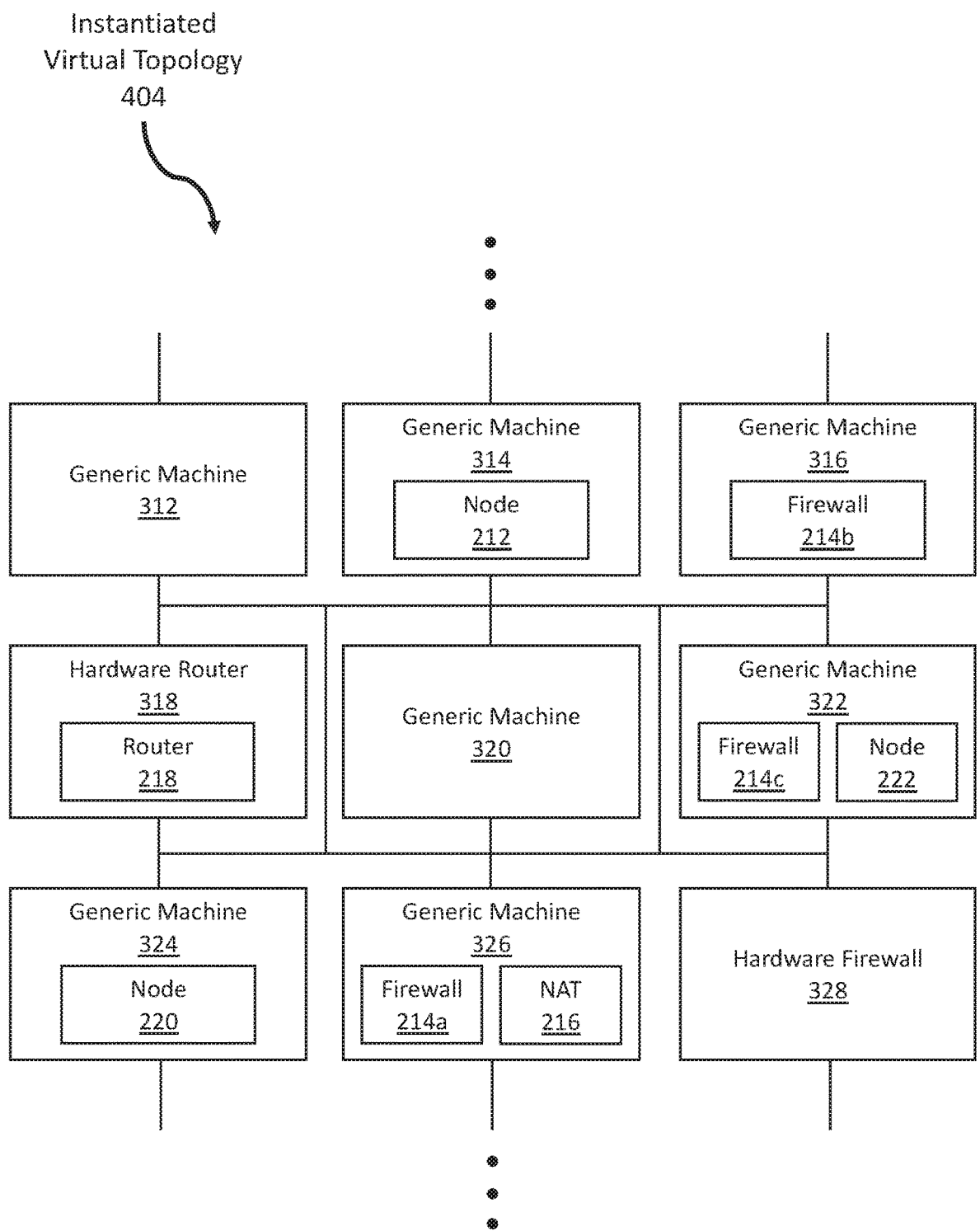

FIG. 4A illustrates an example of an instantiated virtual topology 402. The instantiated virtual topology 402 is based on virtual topology specification 200 (illustrated in FIG. 2) on physical topology 300 (illustrated in FIG. 3). An element of FIG. 4A that is labeled with a same number as a particular element of FIG. 2 or 3 corresponds to the particular element of FIG. 2 or 3.

A generic machine of physical topology 300 executing a virtual machine and/or software application may instantiate a VTE of virtual topology specification 200. As illustrated, generic machine 314 instantiates node 212. Generic machine 324 instantiates node 220.

Additionally, a function-specific hardware device of physical topology 300 may instantiate a VTE of virtual topology specification 200. As illustrated, hardware firewall 328 instantiates firewall 214.

A single digital device of physical topology 204 may instantiate multiple VTEs of virtual topology specification 200. The digital device may instantiate multiple VTEs using multiple virtual machines, containers, and/or software applications. Alternatively, the digital device may instantiate multiple VTEs using a single virtual machine and/or software application. As illustrated, generic machine 326 instantiates both router 218 and NAT 216. Router 218 and NAT 216 may be executed by separate virtual machines and/or software application executing on generic machine 326. Alternatively, router 218 and NAT 216 may be executed by a same virtual machine and/or software application executing on generic machine 326.

The following is an example of the traversal of components in the transmission of data from node 212 to either node 220 or node 222. Initially, node 212 of generic machine 314 transmits the data to firewall 214, implemented by hardware firewall 328. Firewall 214 transmits the data to NAT 216 of generic machine 326. NAT 216 transmits the data to router 218 of generic machine 326. Based on a determination made by router 218, router 218 transmits the data to either node 220 of generic machine 324 or node 222 of generic machine 322.

As data is transmitted between VTEs, the data is tunneled through the underlying network corresponding to the physical topology 300. Each VTE is associated with an encapsulation-decapsulation network interface card (also referred to herein as an "encap-decap NIC"). An encap-decap NIC includes encapsulation mappings for VTEs in the virtual topology. An encapsulation mapping for a VTE includes (a) an overlay address corresponding to a VTE and (b) an underlay address that may be used to transmit data via the underlying network to the overlay address. The underlay address may be an address of a digital device that instantiates the VTE. Alternatively, the underlay address may be a next hop for forwarding data towards the VTE.

Referring to the illustrated example, node 212 generates data addressed to node 220 using the overlay address of node 220. An encap-decap NIC associated with node 212 receives the data. The encap-decap NIC determines that the data is addressed to the overlay address of node 220. The encap-decap NIC determines the underlay address of the next hop for forwarding the data towards node 220, which is the underlay address associated with firewall 214. The underlay address associated with firewall 214 is the underlay address of hardware firewall 328. The encap-decap NIC encapsulates the data using the underlay address associated with firewall 214. The encap-decap NIC transmits the encapsulated data to firewall 214.

An encap-decap NIC associated with firewall 214 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with NAT 216. The underlay address associated with NAT 216 is the underlay address of generic machine 326. The encap-decap NIC encapsulates the data using the underlay address associated with NAT 216. The encap-decap NIC transmits the encapsulated data to NAT 216.

An encap-decap NIC associated with NAT 216 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with router 218. The underlay address associated with router 218 is the underlay address of generic machine 326. The encap-decap NIC encapsulates the data using the underlay address associated with router 218. The encap-decap NIC transmits the encapsulated data to router 218.

An encap-decap NIC associated with router 218 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with node 220. The underlay address associated with node 220 is the underlay address of generic machine 324. The encap-decap NIC encapsulates the data using the underlay address associated with node 220. The encap-decap NIC transmits the encapsulated data to node 220.

In alternative embodiments, when data is transmitted from NAT 216 to router 218, generic machine 326 (and/or a component thereof) may determine that both NAT 216 and router 218 are implemented by generic machine 326. Hence, when the NAT 216 transmits data to the router 218, the data is not encapsulated. The NAT 216 transmits the data directly to the router 218. When the router 218 transmits the data to the next hop (which is implemented by a different machine of the physical topology 300), then the data is encapsulated for transmission through the underlay network.

As described above, there may be multiple ways to instantiate a virtual topology, described by a same virtual topology specification, on a physical topology. FIG. 4B illustrates another example of an instantiated virtual topology 404. The instantiated virtual topology 404 is based on virtual topology specification 200 (illustrated in FIG. 2) on physical topology 300 (illustrated in FIG. 3). An element of FIG. 4B that is labeled with a same number as a particular element of FIG. 2 or 3 corresponds to the particular element of FIG. 2 or 3.

As illustrated, generic machine 314 instantiates node 212. Generic machine 316 instantiates firewall 214b. Hardware router 318 instantiates router 218. Generic machine 322 instantiates firewall 214c and node 222. Generic machine 324 instantiates node 220. Generic machine 326 instantiates firewall 214a and NAT 216.

Multiple digital devices of physical topology 300 may instantiate a single VTE of virtual topology specification 200. As illustrated, generic machines 326, 316, and 322 together instantiate firewall 214 of virtual topology specification 200. In this example, firewall 214 is distributed to multiple digital devices. Each of firewall 214a, 214b, and 214c is a distributed element of firewall 214.

Data being processed by the computer network does not necessarily traverse all of the distributed elements of a single VTE. Data being processed by the computer network does not necessarily traverse various VTEs in a same order as indicated in the virtual topology specification 200. The following is an example of the traversal of components in the transmission of data from node 212 to node 220 or node 222. Initially, node 212 of generic machine 314 transmits the data to firewall 214a of generic machine 326. Firewall 214a transmits the data to NAT 216 of generic machine 326. NAT 216 transmits the data to hardware router 318. Based on a determination made by hardware router 318, hardware router 318 transmits the data to either firewall 214b of generic machine 316 or firewall 214c of generic machine 322. Firewall 214b transmits the data to node 220 of generic machine 324. Alternatively, firewall 214c transmits the data to node 222 of generic machine 322.

As illustrated in this example, the traversal of NAT 216 and hardware router 318 occurs between (a) the traversal of firewall 214a and (b) the traversal of firewall 214b. Alternatively, the traversal of NAT 216 and hardware router 318 occurs between (a) the traversal of firewall 214a and (b) the traversal of firewall 214c. Hence, the actual communication path taken by the data is different than the communication path indicated in the virtual topology 200.

Further, as illustrated in this example, data that is destined for node 220 traverses firewall 214a and firewall 214b, without traversing through firewall 214c. Alternatively, data that is destined for node 222 traverses firewall 214a and firewall 214c, without traversing through firewall 214b. Hence, the data does not necessarily traverse through all distributed elements (firewall 214a-c) of a single VTE.

Distribution of a single VTE across multiple digital devices may be performed to increase performance and/or efficiency of a computer network. As an example, virtual topology specification 200 may specify the following functions for firewall 214:

(a) Reject data that has a source IP address of Address X;
(b) If the destination of the data is node 220, reject data that includes Data Y;
(c) If the destination of the data is node 222, reject data that includes Data Z.

Functions (b) and (c) are only executed for a subset of data that traverses firewall 214. Specifically, function (b) is executed only for data addressed to node 220. Function (c) is executed only for data addressed to node 222.

If firewall 214 is not distributed to multiple digital devices, then the single digital device that instantiates firewall 214 needs to perform all of functions (a), (b), and (c) on any data that traverses firewall 214. Firewall 214 needs to determine whether any data has a source IP address of Address X. Firewall 214 needs to determine whether the data is addressed to node 220, and if yes, whether the data includes Data Y. Firewall 214 needs to determine whether the data is addressed to node 222, and if yes, whether the data includes Data Z.

In contrast to the above example, distributing firewall 214 to multiple digital devices would require firewall 214a of generic machine 326 to only perform function (a) on a set of data that traverses firewall 214a. Thereafter, firewall 214a transmits the set of data to NAT 216 of generic machine 326. NAT 216 transmits the set of data to hardware router 318. Hardware router 318 routes a subset of data, addressed to node 220, to node 220. Hardware router 318 routes a subset of data, addressed to node 222, to node 222. As an inherent part of the routing functionality, hardware router 318 identifies the data for which function (b) is applicable (that is, data addressed to node 220). Hardware router 318 also identifies the data for which function (c) is applicable (that is, data addressed to node 222). Based on the determination made by hardware router 318, hardware router 318 transmits a subset of data to either firewall 214b or firewall 214c. Firewall 214b need only perform function (b) for the subset of data routed to firewall 214b. Firewall 214c need only perform function (c) for the subset of data routed to firewall 214c. Hence, firewalls 214a, 214b, and 214c operate in a distributed manner to increase performance and/or efficiency of the computer network.

3. Data Transformation System Architecture

Figure 5:
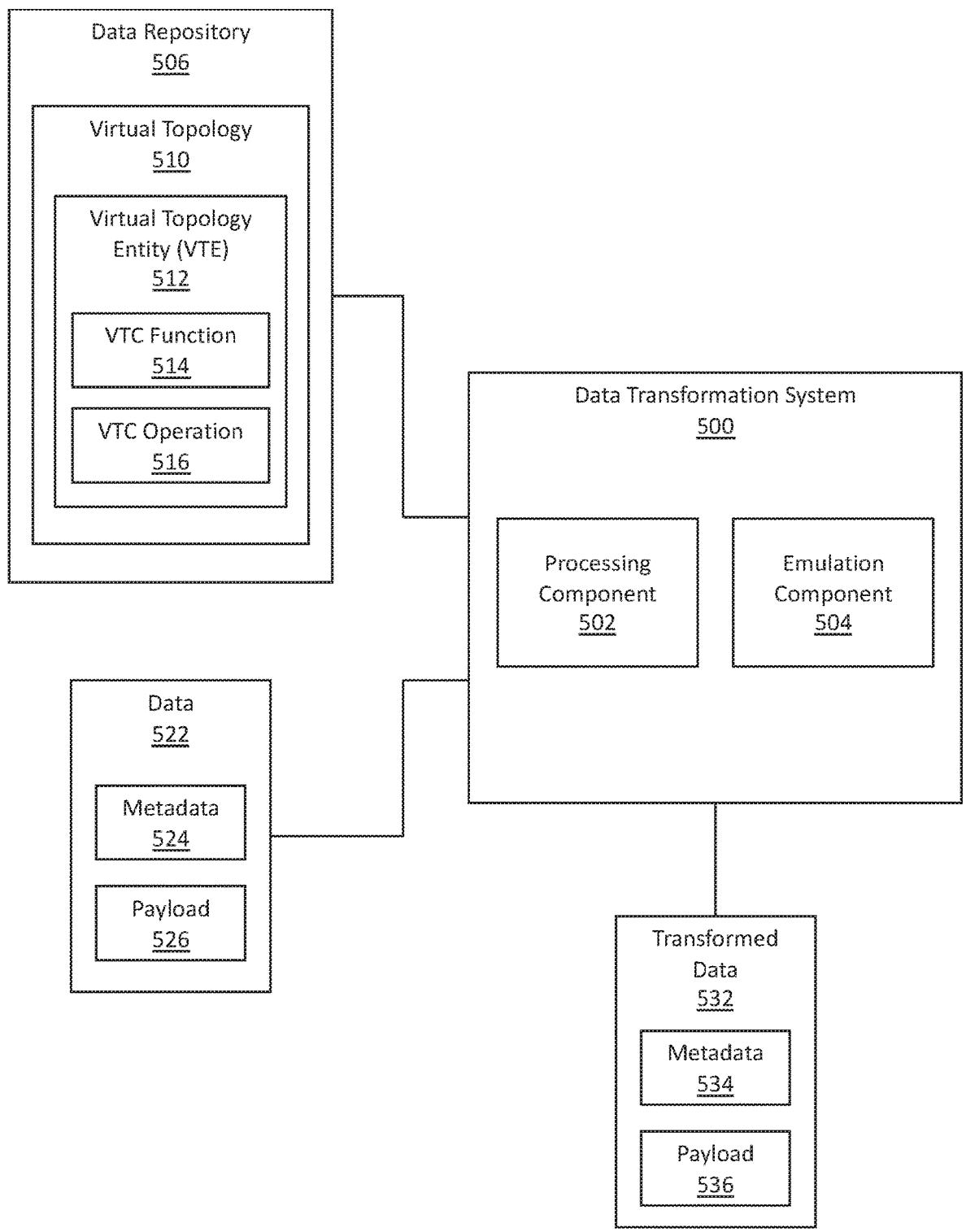
FIG. 5 illustrates a data transformation system, in accordance with one or more embodiments.

FIG. 5 illustrates a data transformation system, in accordance with one or more embodiments. As illustrated in FIG. 5, data transformation system 500 includes a processing component 502 and an emulation component 504. Data transformation system 500 is communicatively coupled to a data repository 506. In one or more embodiments, data transformation system 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component.

In one or more embodiments, data 522 includes information in a data frame that is processed by nodes of an overlay network. Data 522 may but does not necessarily include encapsulation and/or decapsulation information. Encapsulation information (such as an underlay address of a next hop) may be added to data 522 for transmitting data 522 between nodes of an overlay network through an underlay network.

Data 522 includes metadata 524 and payload 526.

Metadata 524 includes information that describes a characteristic and/or property of data 522. Metadata 524 may include information that is necessary for proper transmission of data 522 in a computer network. Metadata 524 may include, for example, an identifier of an overlay node that transmitted data 522, and/or an identifier of an overlay node that is to receive data 522. Metadata 524 may be stored in the form of a header of a packet and/or frame including data 522. Metadata 524 may also be referred to as overhead data.

Examples of metadata 524 include: a source identifier, a destination identifier, identifiers of components traversed by data 522, permissions associated with data 522, tags associated with data 522, a time-to-live (TTL) value, a hop count, a timestamp, a checksum corresponding to payload 526, a number of bytes of payload 526, and a data type of payload 526.

A TTL value (also referred to as a "hop limit") of data 522 is a maximum lifetime of data 522 in a computer network. The TTL value specifies a maximum number of hops that data 522 may traverse while remaining valid. A hop is any VTE that is traversed by data 522. As data 522 traverses through the hops, each hop decrements the TTL value by one. When the TTL value reaches zero, data 522 is no longer valid. As an example, a TTL value of three hops indicates that the data is allowed to traverse a maximum of three hops. At the fourth hop, the data will be regarded as invalid. Invalid data will not be processed according to the normal operations of the computer network. Invalid data may trigger the generation of an error message.

A hop count is a number of hops that data 522 has traversed. As data 522 traverses through the hops, each hop increments the hop count by one. The hop count may be compared to a maximum number of hops allowed for data 522. If the hop count exceeds the maximum number, then data 522 is no longer valid.

Payload 526 includes an actual message carried by data 522. In some examples, payload 526 may include information that is presented to a user via a user interface. Payload 526 may include information that is used by an end user and/or a business application. As an example, a computer network may implement a sales application for multiple client devices. The payload of data to be processed by the computer network may include sales transaction records, product information, and customer information. As another example, a computer network may implement an email system for a particular company. The payload of data to be processed by the computer network may include incoming and outgoing emails of users associated with the particular company.

In one or more embodiments, data repository 506 is any type of storage unit and/or device (e.g., a file system, database, collection of tables, or any other storage mechanism) for storing data. Further, data repository 506 may include multiple different storage units and/or devices. The multiple different storage units and/or devices may or may not be of the same type or located at the same physical site. Further, data repository 506 may be implemented or may execute on the same computing system as data transformation system 500. Alternatively or additionally, data repository 506 may be implemented or executed on a computing system separate from data transformation system 500. Data repository 506 may be communicatively coupled to data transformation system 500 via a direct connection or via a network.

Information describing virtual topology 510 may be implemented across any of components illustrated in FIG. 5. However, this information is illustrated within data repository 506 for purposes of clarity and explanation.

In one or more embodiments, virtual topology 510 is a description of a particular arrangement of virtual topology entities (VTEs) 512. Additional embodiments and/or examples relating to virtual topology 510 are described above in Section 2, titled "Physical Topologies and Virtual Topologies."

Each VTE 512 is associated with one or more VTE functions 514 and VTE operations 516. VTE function 514 is a function that is performed by the VTE. VTE function 514 may be performed in order to achieve and/or improve particular security, resiliency, and/or performance levels. Examples of VTE functions 514 include:

(j) Routing and/or forwarding data to a next hop;
(k) Filtering and/or rejecting data based on a criterion;
(l) Inspecting data for security issues and/or other issues;
(m) Hiding and/or modifying a source address and/or destination address of data;
(n) Distributing data to resources based on availability of resources;
(o) Compressing data; and
(p) Caching data.

VTE operation 516 is an operation executed on the data that is not necessary for the performance of VTE function 514. VTE operation 516 may be performed in order to monitor and/or track a communication path traversed by data through a computer network. Performance of VTE operation 516 may modify metadata 524, without modifying payload 526. Examples of VTE operations 516 include:

(a) Decreasing a TTL value of the data;
(b) Increasing a hop count of the data;
(c) Updating an identifier indicating the last VTE that processed the data;
(d) Including an identifier of the VTE into a list of VTEs traversed by the data;
(e) Inserting a timestamp indicating the time at which the last operation was performed on the data; and
(f) Inserting, removing, and/or modifying a tag associated with the data.

In one or more embodiments, data transformation system 500 refers to hardware and/or software configured to perform operations described herein for transforming data 522 based on virtual topology 510. Examples of operations for transforming data based on virtual topology 510 are described below with reference to FIGS. 6A-6B.

Data transformation system 500 includes processing component 502 and emulation component 504. Processing component 502 refers to hardware and/or software configured to perform operations described herein for processing data 522 to perform one or more VTE functions 514. Emulation component refers to hardware and/or software configured to perform operations described herein for modifying data 522 to emulate performance of VTE functions 514 by one or more VTEs 512.

Data transformation system 500 is implemented on one or more digital devices corresponding to a physical topology of a computer network. Processing component 502 and emulation component 504 may be implemented on a same digital device or different digital devices. In an embodiment, processing component 502 and emulation component 504 are a same component that performs a processing function separately from an emulation function.

In one or more embodiments, transformed data 532 is a version of data 522 that has been transformed by data transformation system 500. Transformed data 532 includes metadata 534 and payload 536. Transformed data 532 includes both (a) any modifications to data 522 resulting from performance of VTE functions 514 and (b) any modification to data 522 resulting from execution of VTE operations 516.

4. Transforming Data Based on a Virtual Topology

Figure 6A:
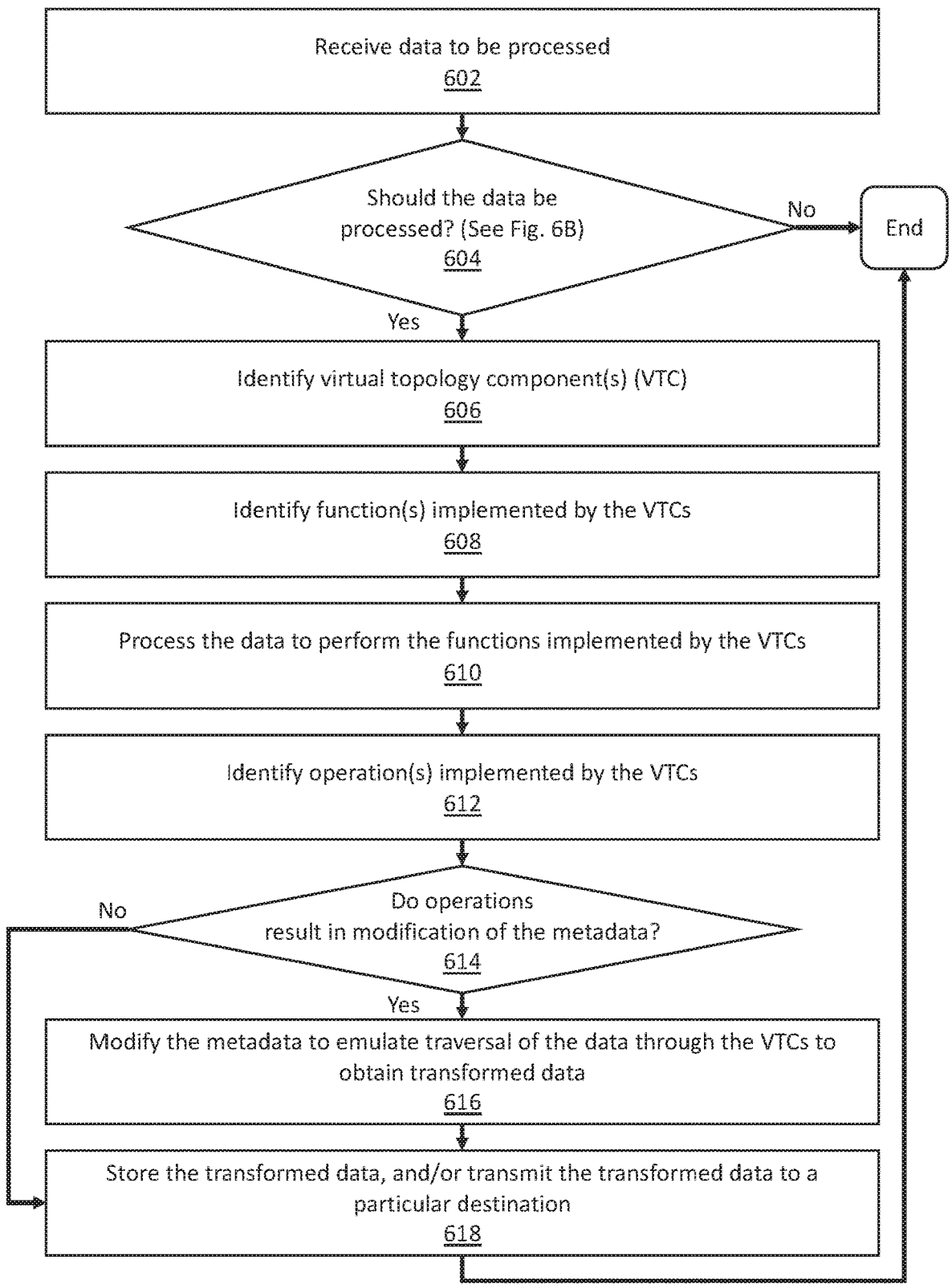
FIGS. 6A-6B illustrate an example set of operations for transforming data based on a virtual topology, in accordance with one or more embodiments.
Figure 6B:
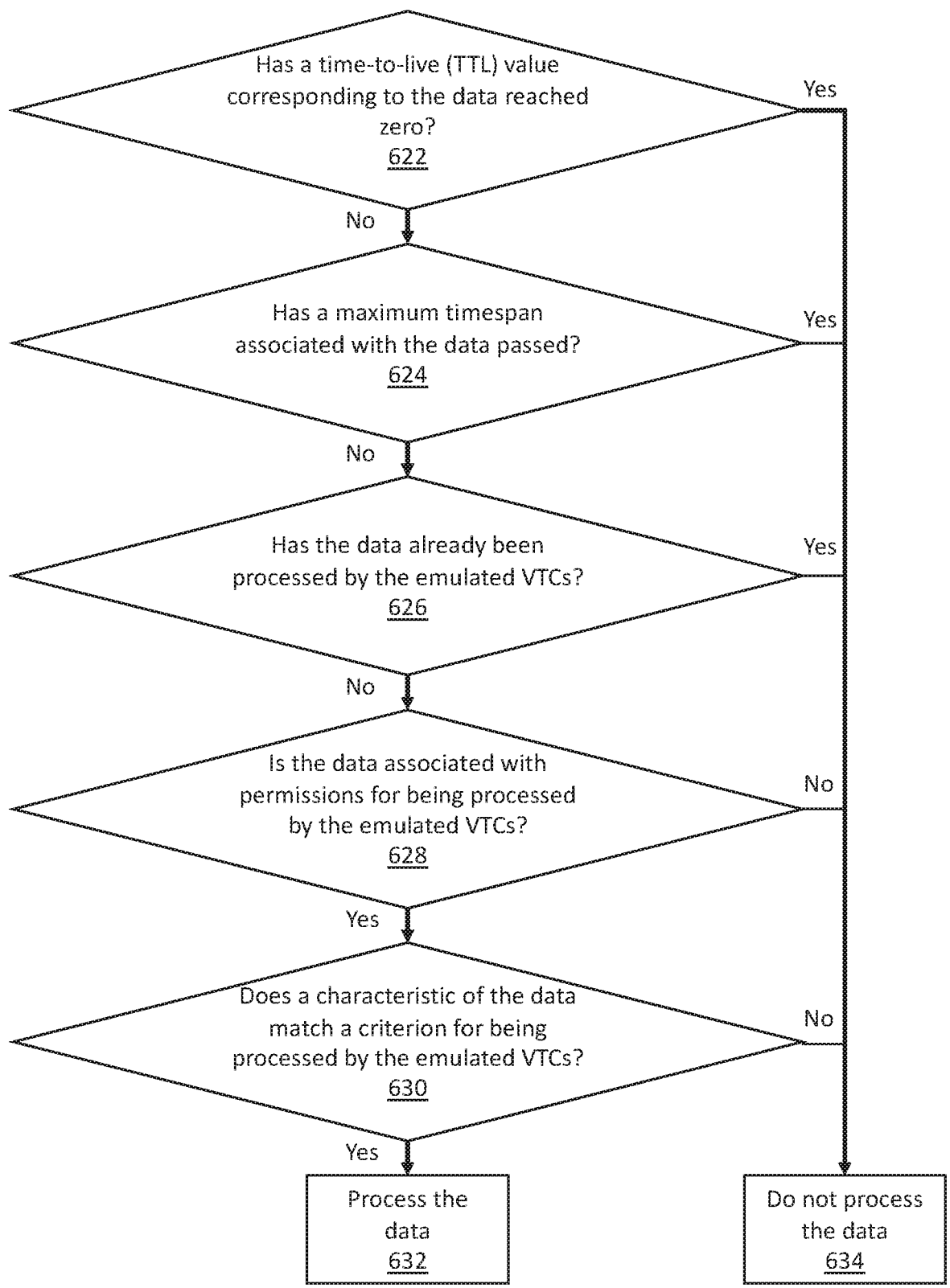

FIGS. 6A-6B illustrate an example set of operations for transforming data based on a virtual topology, in accordance with one or more embodiments. One or more operations illustrated in FIGS. 6A-6B may be modified, rearranged, or omitted all together. As an example, Operation 606 (identifying VTEs) may be performed prior to Operation 604 (determining whether data should be processed). Accordingly, the particular sequence of operations illustrated in FIGS. 6A-6B should not be construed as limiting the scope of one or more embodiments.

One or more embodiments include receiving data to be processed by a computer network (Operation 602). A processing component 502 of a data transformation system 500 (and/or another component of the data transformation system 500) receives the data. The processing component 502 is implemented by a digital device corresponding to a physical topology of the computer network. The processing component is configured to perform one or more functions of VTEs 512 corresponding to a virtual topology 510 of the computer network. In an embodiment, a particular VTE may be distributed across multiple processing components. Each processing component 502 is configured to perform a different subset of the functions of the particular VTE.

The processing component 502 may receive the data from another processing component of the computer network. The other processing component may emulate another VTE of the computer network.

Alternatively, the processing component 502 may receive the data from a component that is external to the computer network. As an example, the processing component 502 may receive the data from the Internet.

One or more embodiments include determining whether the data should be processed (Operation 604). The processing component 502 may determine whether to process the data based on the metadata corresponding to the data. The processing component 502 executes various analyses to make the determination on whether to process the data. Examples of such analyses are described below with reference to FIG. 6B. Some or all of the analyses described below may be used to determine whether to process data based on the metadata corresponding to the data.

One or more embodiments include determining whether a time-to-live (TTL) value, corresponding to the data, has reached zero (0) (Operation 622). The TTL value is embedded and/or attached to the data. The TTL value may be included in the metadata corresponding to the data. The processing component 502 identifies the TTL value from the data. If the TTL value is zero, then the processing component 502 determines that the data should not be processed (Operation 634).

Additionally or alternatively, one or more embodiments include determining whether a hop count has reached a maximum number of hops allowed for the data. The processing component 502 identifies the hop count from the data. If the hop count has reached the maximum number of hops, then the processing component 502 determines that the data should not be processed (Operation 634).

One or more embodiments include determining whether a maximum timespan associated with the data has passed (Operation 624). The maximum timespan may be determined with reference to a time of creation of the data. Additionally or alternatively, the maximum timespan may be determined with reference to a time of the last process performed on the data.

A timestamp is embedded and/or attached to the data. The timestamp may be included in the metadata corresponding to the data. The timestamp may indicate a time of creation of the data and/or a time of the last process performed on the data. The processing component 502 compares the timestamp with the current time. If the timespan between the timestamp and the current time is greater than the maximum timespan allowed for the data, then the processing component 502 determines that the data should not be processed (Operation 634).

One or more embodiments include determining whether the data has already been processed by the VTE that is being emulated (Operation 626). A list of VTEs that have already processed the data is embedded and/or attached to the data. The list of VTEs that have already processed the data may be included in the metadata corresponding to the data. The processing component 502 identifies an identifier of the VTE whose functions are performed by the processing component 502. The processing component 502 determines whether the identifier of the emulated VTE is included in the list of VTEs that have already processed the data. If the identifier of the emulated VTE is included in the list of VTEs that have already processed the data, then the processing component 502 determines that the data should not be processed (Operation 634).

One or more embodiments include determining whether the data is associated with permissions for being processed by the VTE that is being emulated (Operation 628). Permissions associated with the data is embedded and/or attached to the data. Permissions associated with the data may be included in the metadata corresponding to the data. The processing component 502 identifies security policies and/or settings associated with the VTE whose functions are performed by the processing component 502. The processing component 502 analyzes the permissions associated with the data with respect to the security policies and/or settings of the emulated VTE. If the data is not associated with the appropriate permissions in accordance with the security policies and/or settings of the emulated VTE, then the processing component 502 determines that the data should not be processed (Operation 634).

As an example, a security policy may include two security levels that may be associated with any data within a computer network. Data associated with a "low" security level may be processed by any VTEs of the computer network. Data associated with a "high" security level may be processed by only a particular subset of VTEs of the computer network. Data associated with a "high" security level may not be processed by VTEs that are not within the particular subset. Based on an instantiation of a virtual topology on a physical topology, a particular VTE that is not within the particular subset of VTEs may be mapped to a particular data transformation system.

Continuing the example, a processing component of the particular data transformation system may determine a security level associated with the data from the metadata corresponding to the data. If the security level is "high," then the processing component may determine that the data should not be processed.

As another example, a security setting of a particular VTE may permit processing of only data that has been verified by another VTE. A processing component performing the functions of the particular VTE may analyze the metadata corresponding to the data to determine whether the data has been verified by the other VTE. If the data has not been verified by the other VTE, then the processing component may determine that the data should not be processed.

One or more embodiments include determining whether a characteristic and/or property of the data matches a particular criterion for being processed by the VTE that is being emulated (Operation 630). A characteristic and/or property of the data is embedded and/or attached to the data. The characteristic and/or property of the data may be included in the metadata corresponding to the data. As an example, a characteristic of data may be whether or not the data is an email. As another example, a characteristic of data may be whether or not the data has been processed by any firewalls.

The processing component 502 identifies one or more criteria for processing the data. As an example, a VTE may perform the function of mail filtering. A criterion for processing data by the VTE may require that the type of payload included in the data be an email. As another example, a criterion for processing data by a particular VTE may require that the data be previously processed by at least one firewall. If the characteristic and/or property of the data does not satisfy the criteria, then the processing component 502 determines that the data should not be processed (Operation 634).

In one or more embodiments, the processing component 502 may execute one or more of the analyses illustrated in FIG. 6B. The processing component 502 may also execute additional and/or alternative analyses. If the processing component 502 determines that each criterion for processing the data is satisfied, then the processing component 502 determines that the data should be processed (Operation 632).

Returning to FIG. 6A, one or more embodiments include identifying one or more VTEs that are being emulated (Operation 606). As noted above, Operation 606 may be performed prior to Operation 604; the specific order of operations described herein should not be construed as limiting the scope of the claims. The processing component 502 identifies the VTEs that are being emulated based on a particular instantiation of a virtual topology on a physical topology. The particular instantiation of the virtual topology on the physical topology specifies a mapping of one or more VTEs to the processing component 502. Additionally or alternatively, the particular instantiation of the virtual topology on the physical topology specifies a mapping of a distributed element of a VTE to the processing component 502.

One or more embodiments include identifying one or more functions implemented by the VTEs (Operation 608). The processing component 502 identifies the functions implemented by the VTEs from the virtual topology. The virtual topology includes specification of functions performed by each VTE. As an example, the functions performed by a VTE may be specified in code form.

One or more embodiments include processing the data to perform the functions implemented by the VTEs (Operation 610). The processing component 502 executes a set of processes to perform the functions implemented by the VTEs. The particular set of processes executed is determined based on the particular functions implemented by the VTEs. The performance of the functions of the VTEs may be based on the payload and/or the metadata of the data.

As an example, a particular VTE may be a firewall. The particular VTE may reject data associated with a source address of Address X. A processing component associated with the particular VTE may perform the firewall function by determining whether the source address of the data is Address X. The processing component may permit transmission of the data if the source address is not Address X. The processing component may reject transmission of the data if the source address is Address X.

As another example, a particular VTE may be a router. The particular VTE may identify Component Y as a next hop for any data addressed to Network M. The particular VTE may identify Component Z as a next hop for any data addressed to Network N. A processing component associated with the particular VTE may perform the routing function by determining whether the data is addressed to Network M or Network N. The processing component may route the data to Component Y if the data is addressed to Network M. The processing component may route the data to Component Z if the data is addressed to Network N.

As another example, a particular VTE may be a load balancer. The particular VTE may forward data to one of a set of resources based on the loads of the set of resources. A processing component associated with the particular VTE may perform the load balancing function by determining the loads of the set of resources. The processing component may identify one of the set of resources as the resource with the lowest load. The processing component may forward the data to the resource with the lowest load.

One or more embodiments include identifying one or more operations implemented by the VTEs (Operation 612). An emulation component 504 of the data transformation system 500 (and/or another component of the data transformation system 500) identifies the operations implemented by the VTEs from the virtual topology. The virtual topology includes specification of operations performed by each VTE. As an example, the operations performed by a VTE may be specified in code form.

One or more embodiments include determining whether the operations result in modification of the metadata corresponding to the data (Operation 614). The metadata may be included in the data frame that is processed by nodes of an overlay network. The emulation component 504 determines whether the operations result in modification of the metadata based on the particular instantiation of the virtual topology on the physical topology.

The particular instantiation of the virtual topology on the physical topology may include distribution of a particular VTE of the virtual topology to multiple digital devices of the physical topology. As an example, a virtual topology may include a particular VTE associated with Operation X and Operation Y. Based on an instantiation of the virtual topology on a physical topology, the particular VTE may be distributed to Digital Device M and Digital Device N. As part of the distribution of the particular VTE, Operation X is distributed to Digital Device M. Furthermore, Operation Y is distributed to Digital Device N. An emulation component implemented on Digital Device M would modify the data based on Operation Y, but not Operation Z. At Digital Device M, Operation Z would not result in modification of the metadata. Conversely, an emulation component implemented on Digital Device N would modify the data based on Operation Z, but not Operation Y. At Digital Device N, Operation Y would not result in modification of the metadata.

As another example, an operation associated with a particular VTE may be decrementing a TTL value by one (1). Two digital devices, Digital Device M and Digital Device N, may instantiate the particular VTE. Only one of the two digital devices, Digital Device M, would perform the operation of decrementing the TTL value by one. The operation does not result in modification of the metadata when the data is traversing Digital Device N.

One or more embodiments include modifying the metadata to emulate traversal of the data through the VTEs to obtain transformed data (Operation 616). The emulation component 504 executes the operations that result in modification of the metadata. In an embodiment, multiple different processing steps (as described above with reference to Operation 610) may be performed first, and followed by multiple different emulating steps (as described below with reference to Operation 616). The emulating steps, as described with reference to Operation 616, may be performed separately from and/or independently of the processing steps as described with reference to Operation 610.

As an example, an operation implemented by a VTE may be decrementing a TTL value included in the metadata. The emulation component 504 may decrement the TTL value by one.

As another example, an operation implemented by a VTE may be increasing a hop count included in the metadata. The emulation component 504 may increment the hop count by one.

As another example, an operation implemented by a VTE may be modifying a tag included in the metadata to indicate that the data is being sent from the VTE. The emulation component 504 may modify the tag to include an identifier of the VTE.

As another example, an operation implemented by a VTE may be updating a list, included in the metadata, identifying VTEs that were previously traversed by the data. The emulation component 504 may insert an identifier of the VTE into the list.

As another example, an operation implemented by a VTE may be inserting a timestamp in the metadata to indicate the time at which a function of the VTE was performed. The emulation component 504 may insert a timestamp indicating a time at which the function of the VTE was performed.

As another example, an operation implemented by a VTE may be updating a set of permissions associated with the data. The permissions may be updated based on a verification of the data performed by the VTE and/or other functions performed by the VTE. The emulation component 504 may modify the permissions associated with the data to indicate that the data has been verified by the VTE.

In an embodiment, the data modified by the emulation component 504 indicates that a particular communication path has been traversed by the data. The particular communication path may include a particular VTE and/or a particular sequence of VTEs. The particular communication path may be determined based on a forwarding policy implemented by the virtual topology. As an example, multiple routes may exist between a source VTE and a destination VTE. A forwarding policy may specify that a communication path to be traversed by a data packet from the source VTE to the destination VTE includes a particular firewall and a particular NAT. A data packet may be transmitted from the source VTE to the destination VTE. The data packet may include data that is modified by one or more emulation components. The modified data may indicate that the communication path traversed by the data packet includes the particular firewall and the particular NAT.

However, the particular communication path may differ from the actual communication path traversed by the data. The actual communication path traversed by the data includes one or more digital devices of a physical topology. The actual communication path traversed by the data may also include one or more virtual machines and/or software applications executed by digital devices of the physical topology. Moreover, a number of VTEs included in the particular communication path may be different from a number of digital devices included in the actual communication path.

In an embodiment, the operation of modifying the data to emulate performance of the functions by the VTEs is performed after the operation of processing the data to perform the functions of the VTEs. A processing component may process the data to perform multiple functions. Meanwhile, an emulation component postpones modification of the data to emulate performance of the multiple functions by the VTEs until after the processing component has completed performance of the multiple functions. As an example, a processing component may process data to perform a firewall function of a VTE and a NAT function of another VTE. A TTL value of the data may remain unchanged between the performance of the firewall function and the NAT function. After completion of the performance of the firewall function and the NAT function, an emulation component may decrement the TTL value by two. The decrement of the TTL value by two indicates that the data has traversed two VTEs.

In an embodiment, the operation of modifying the data to emulate performance of one or more functions by one or more VTEs is performed before the operation of processing the data to perform the functions of the VTEs. As an example, a processing component may be configured to process data to perform a firewall function of the VTE. Prior to inspecting the data to determine whether to allow or reject the data, an emulation component may insert an identifier of the VTE into the metadata, indicating that the data has traversed the VTE. The processing component may then proceed to inspect the data to determine whether to allow or reject the data.

In an embodiment, performance of the operation of modifying the data to emulate performance of one or more functions by one or more VTEs is postponed until the last hop on a communication path. As an example, a virtual topology may include a source node, a firewall, a NAT, and a destination node. Data may be transmitted from the source node, to the firewall, to the NAT, and finally to the destination node. Rather than decrementing the TTL by one at each of the firewall, NAT, and destination node, the TTL is decremented by three when the data arrives at the destination node.

One or more embodiments include storing the transformed data, and/or transmitting the transformed data to one or more destinations (Operation 618). If the destination address of the data is the address of the data transformation system 500 (and/or a component thereof), then the data transformation system 500 stores the transformed data. If the destination address of the data is not the address of the data transformation system 500 (and/or a component thereof), then the data transformation system 500 transmits the transformed data to one or more components at the destination address, or a next hop that serves as an intermediate node between the data transformation system 500 and the components at the destination address. The transformed data includes both (a) the data that has been processed by the function implemented by the VTEs at Operation 610 and (b) the data that has been modified by the operations implemented by the VTEs at Operation 612.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 7A:
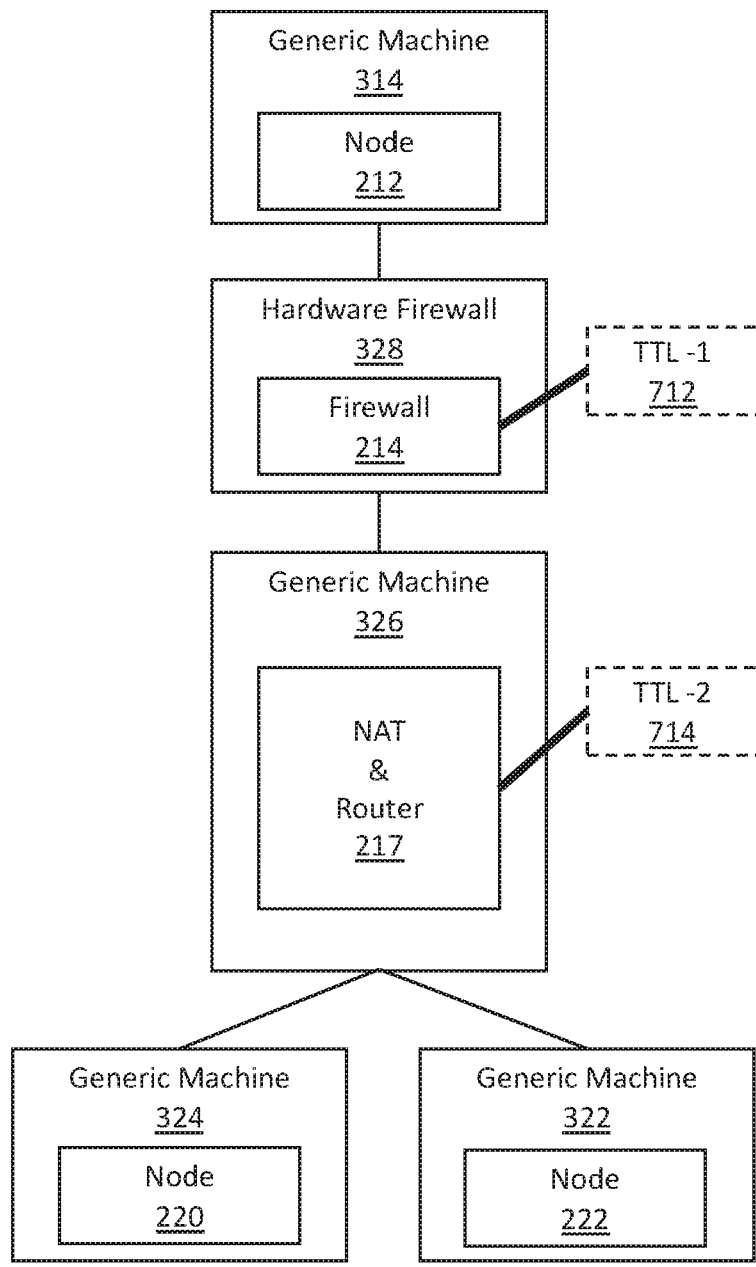
FIGS. 7A-7B illustrate examples of transforming data to emulate performance of functions by one or more components of a virtual topology, in accordance with one or more embodiments.

FIG. 7A illustrates an example of transforming data to emulate performance of functions by one or more components of a virtual topology, in accordance with one or more embodiments. FIG. 7A illustrates a different graphic presentation of the instantiated virtual topology 402, illustrated in FIG. 4A, which is based on virtual topology specification 200 and physical topology 300. An element of FIG. 7A that is labeled with a same number as a particular element of FIG. 2 or 3 corresponds to the particular element of FIG. 2 or 3.

As described above, instantiation of virtual topology specification 200 on physical topology 300 includes mapping VTEs of virtual topology specification 200 to digital devices of physical topology 300. As illustrated, generic machine 314 instantiates node 212. Generic machine 324 instantiates node 220. Generic machine 322 instantiates node 222. Hardware firewall 328 instantiates firewall 214. Generic machine 326 instantiates NAT 216 and router 218 via a software component labeled as "NAT & Router 217."

Initially, data is transmitted from node 212 of generic machine 314. Firewall 214, implemented by hardware firewall 328, receives the data. A processing component of firewall 214 determines whether the data should be processed based on the metadata corresponding to the data. If the data should be processed, the processing component identifies firewall 214 of virtual topology specification 200 as a VTE that is being emulated. The processing component identifies the firewall function implemented by firewall 214 based on virtual topology specification 200. The processing component performs the firewall function on the data by, for example, inspecting the data to determine whether to allow transmission of the data. The processing component may allow transmission of the data to "NAT & Router 217" of generic machine 326.

Additionally, an emulation component of firewall 214 identifies operations implemented by firewall 214 based on virtual topology specification 200. A particular operation implemented by firewall 214 is decrementing the TTL value by one (1). The emulation component of firewall 214 determines whether the particular operation results in modification of the metadata corresponding to the data. Since firewall 214 has not been distributed to multiple digital devices, the emulation component determines that the particular operation results in modification of the metadata. The emulation component decrements the TTL value by one. As illustrated by box 712, the TTL value is decremented by one.

Firewall 214, implemented by hardware firewall 328, transmits the data to "NAT & Router 217" of generic machine 326. "NAT & Router 217" receives the data. A processing component of "NAT & Router 217" determines whether the data should be processed based on the metadata corresponding to the data. If the data should be processed, the processing component identifies NAT 216 and router 218 of virtual topology specification 200 as VTEs that are being emulated. The processing component identifies the NAT function implemented by NAT 216 based on virtual topology specification 200. The processing component identifies the router function implemented by router 218 based on virtual topology specification 200. The processing component performs the NAT and routing functions on the data.

Additionally, an emulation component of "NAT & Router 217" identifies operations implemented by NAT 216 and router 218 based on virtual topology specification 200. A particular operation implemented by NAT 216 is decrementing the TTL value by one (1). Another operation implemented by router 218 is decrementing the TTL value by one (1). The emulation component of "NAT & Router 217" determines whether the two operations result in modification of the metadata corresponding to the data. Since NAT 216 and router 218 have not been distributed to multiple digital devices, the emulation component determines that the two operations result in modification of the metadata. The emulation component decrements the TTL value by two (2), to perform the two operations associated with NAT 216 and router 218. As illustrated by box 714, the TTL value is decremented by two. "NAT & Router 217" of generic machine 326 transmits the data to node 222 of generic machine 322.

In the example illustrated in FIG. 7A, the emulation component of "NAT & Router 217" modifies the data to emulate performance of the functions by NAT 216 and router 218 after the processing component processes the data to perform the functions of NAT 216 and router 218. A TTL value of the data remains unchanged between the performance of the NAT function of NAT 216 and the routing function of router 218. After completion of the performance of the NAT function and the routing function, the emulation component decrements the TTL value by two. The decrement of the TTL value by two indicates that the data has traversed two VTEs. However, the data has actually traversed only one digital device.

Figure 7B:
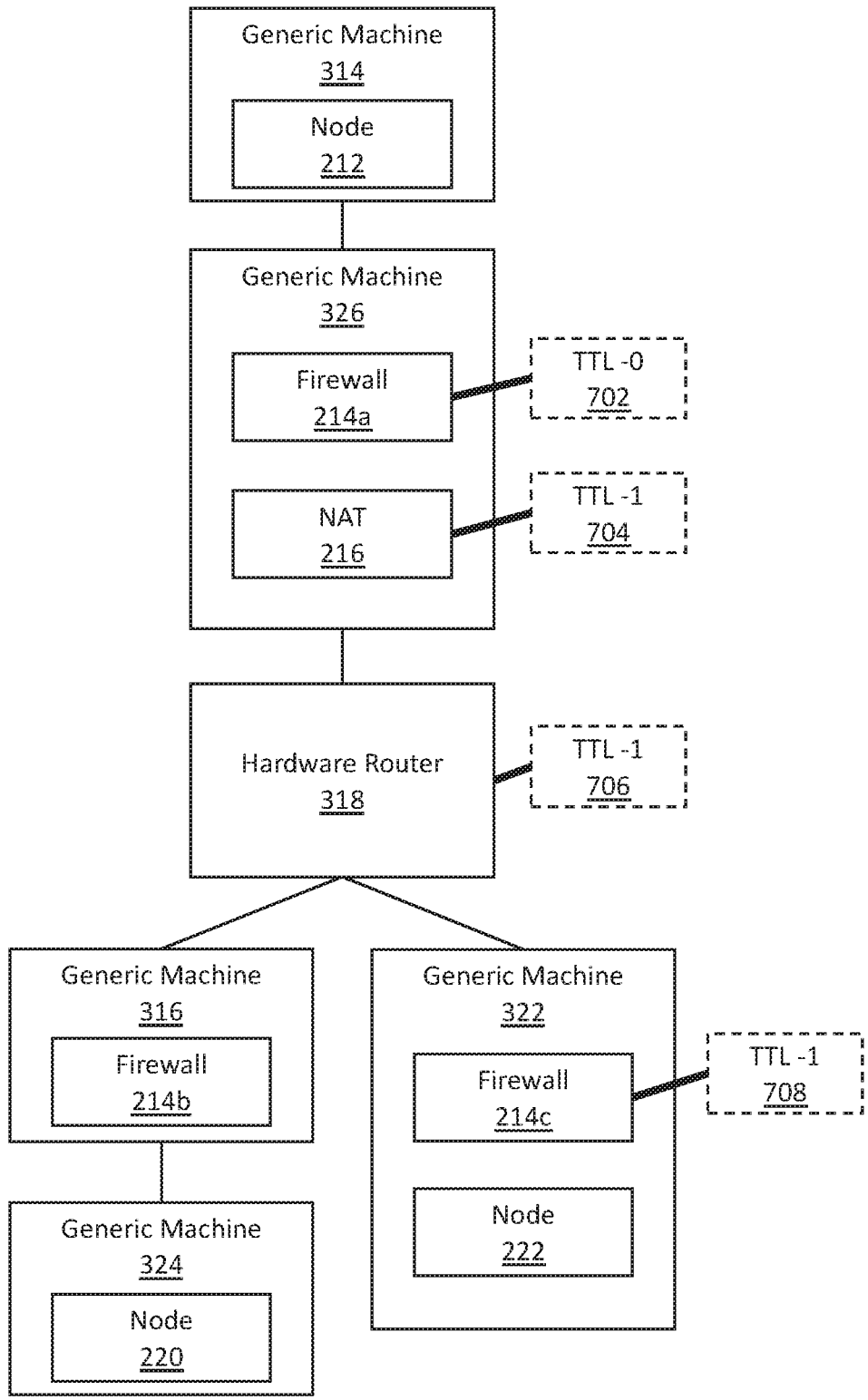

FIG. 7B illustrates another example of transforming data to emulate performance of functions by one or more components of a virtual topology, in accordance with one or more embodiments. FIG. 7B illustrates a different graphic presentation of the instantiated virtual topology 404, illustrated in FIG. 4B, which is based on virtual topology specification 200 and physical topology 300. An element of FIG. 7B that is labeled with a same number as a particular element of FIG. 2 or 3 corresponds to the particular element of FIG. 2 or 3.

As described above, instantiation of virtual topology specification 200 on physical topology 300 includes mapping VTEs of virtual topology specification 200 to digital devices of physical topology 300. As illustrated, generic machine 314 instantiates node 212. Generic machine 324 instantiates node 220. Generic machine 322 instantiates node 222. Generic machine 326 instantiates NAT 216. Hardware router 318 instantiates router 218. Further, generic machines 326, 316, and 322 together instantiate firewall 214.

Initially, data is transmitted from node 212 of generic machine 314. Firewall 214a of generic machine 326 receives the data. A processing component of firewall 214a determines whether the data should be processed based on the metadata corresponding to the data. As an example, the processing component determines whether a TTL value of the data has reached zero. If the data should be processed, the processing component identifies firewall 214 of virtual topology specification 200 as a VTE that is being emulated. The processing component identifies the firewall function implemented by firewall 214 based on virtual topology specification 200. The firewall functions may include:

(a) Reject data that has a source IP address of Address X;

(b) If the destination of the data is node 220, reject data that includes Data Y;

(c) If the destination of the data is node 222, reject data that includes Data Z.

Function (a) may be distributed to the processing component of firewall 214a. The processing component of firewall 214a performs function (a) on the data. The processing component of firewall 214a determines that the data does not have a source IP address of Address X. The processing component of firewall 214a allows transmission of the data to NAT 216 of generic machine 326.

Additionally, an emulation component of firewall 214a identifies operations implemented by firewall 214 based on virtual topology specification 200. A particular operation implemented by firewall 214 is decrementing the TTL value by one (1). The emulation component of firewall 214a determines whether the particular operation results in modification of the metadata corresponding to the data. Based on a particular instantiation of virtual topology specification 200 on physical topology 300, the particular operation is distributed to firewall 214b and/or firewall 214c, instead of firewall 214a. The emulation component of firewall 214a determines that the particular operation does not result in modification of the metadata. As illustrated by box 702, the TTL value is not changed.

Firewall 214a of generic machine 326 transmits the data to NAT 216 of generic machine 326. NAT 216 of generic machine 326 receives the data. A processing component of NAT 216 determines whether the data should be processed based on the metadata corresponding to the data. If the data should be processed, the processing component identifies NAT 216 of virtual topology specification 200 as a VTE that is being emulated. The processing component identifies the NAT function implemented by NAT 216 based on virtual topology specification 200. The processing component performs the NAT function on the data by, for example, modifying a destination address associated with the data.

Additionally, an emulation component of NAT 216 identifies operations implemented by NAT 216 based on virtual topology specification 200. A particular operation implemented by NAT 216 is decrementing the TTL value by one (1). The emulation component of NAT 216 determines whether the particular operation results in modification of the metadata corresponding to the data. Since NAT 216 has not been distributed to multiple digital devices, the emulation component determines that the particular operation results in modification of the metadata. The emulation component decrements the TTL value by one. As illustrated by box 704, the TTL value is decremented by one.

NAT 216 of generic machine 326 transmits the data to hardware router 318. Hardware router 318 receives the data. A processing component of hardware router 318 determines whether the data should be processed based on the metadata corresponding to the data. If the data should be processed, the processing component identifies router 218 of virtual topology specification 200 as a VTE that is being emulated. The processing component identifies the routing function implemented by router 218 based on virtual topology specification 200. The processing component performs the routing function on the data by, for example, identifying a next hop of the data based on the destination address earlier provided by NAT 216. The processing component may determine that the next hop is firewall 214c of generic machine 322.

Additionally, an emulation component of hardware router 318 identifies operations implemented by router 218 based on virtual topology specification 200. A particular operation implemented by router 218 is decrementing the TTL value by one (1). The emulation component of hardware router 318 determines whether the particular operation results in modification of the metadata corresponding to the data. Since router 218 has not been distributed to multiple digital devices, the emulation component determines that the particular operation results in modification of the metadata. The emulation component decrements the TTL value by one. As illustrated by box 706, the TTL value is decremented by one.

Hardware router 318 transmits the data to firewall 214c of generic machine 322. Firewall 214c receives the data. A processing component of firewall 214c determines whether the data should be processed based on the metadata corresponding to the data. If the data should be processed, the processing component identifies firewall 214 of virtual topology specification 200 as a VTE that is being emulated. The processing component identifies the firewall function implemented by firewall 214 based on virtual topology specification 200. Function (c), as described above, may be distributed to firewall 214c. The processing component of firewall 214c performs function (c) on the data. The processing component of firewall 214c determines that the data does not include Data Z. The processing component of firewall 214c allows transmission of the data to node 222 of generic machine 322.

Additionally, an emulation component of firewall 214c identifies operations implemented by firewall 214 based on virtual topology specification 200. A particular operation implemented by firewall 214 is decrementing the TTL value by one (1). The emulation component of firewall 214c determines whether the particular operation results in modification of the metadata corresponding to the data. Based on a particular instantiation of virtual topology 200 on physical topology 300, the particular operation is distributed to firewall 214b and/or firewall 214c. The emulation component of firewall 214c determines that the particular operation results in modification of the metadata. The emulation component of firewall 214c decrements the TTL value by one. As illustrated by box 708, the TTL value is decremented by one. Firewall 214c of generic machine 322 transmits the data to node 222 of generic machine 322.

In the example illustrated in FIG. 7B, the metadata modified by the emulation components indicates that a particular communication path has been traversed by the data. Specifically, the metadata indicates the data traversed a particular sequence of VTEs: firewall 214, NAT 216, and router 218. The metadata indicate that the total number of VTEs traversed is three. However, the particular communication path differs from the actual communication path traversed by the data. Specifically, the data actually traversed: firewall 214a of generic machine 326, NAT 216 of generic machine 326, hardware router 318, and firewall 214c of generic machine 322. The number of components actually traversed is four.

6. Computer Networks

In one or more embodiments, a computer network provides connectivity among a set of nodes. The set of nodes are connected by a set of links. The nodes may be local to and/or remote from each other. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a service provider provides a computer network to one or more end users. Various service models may be implemented by the computer network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, and/or tenant isolation.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
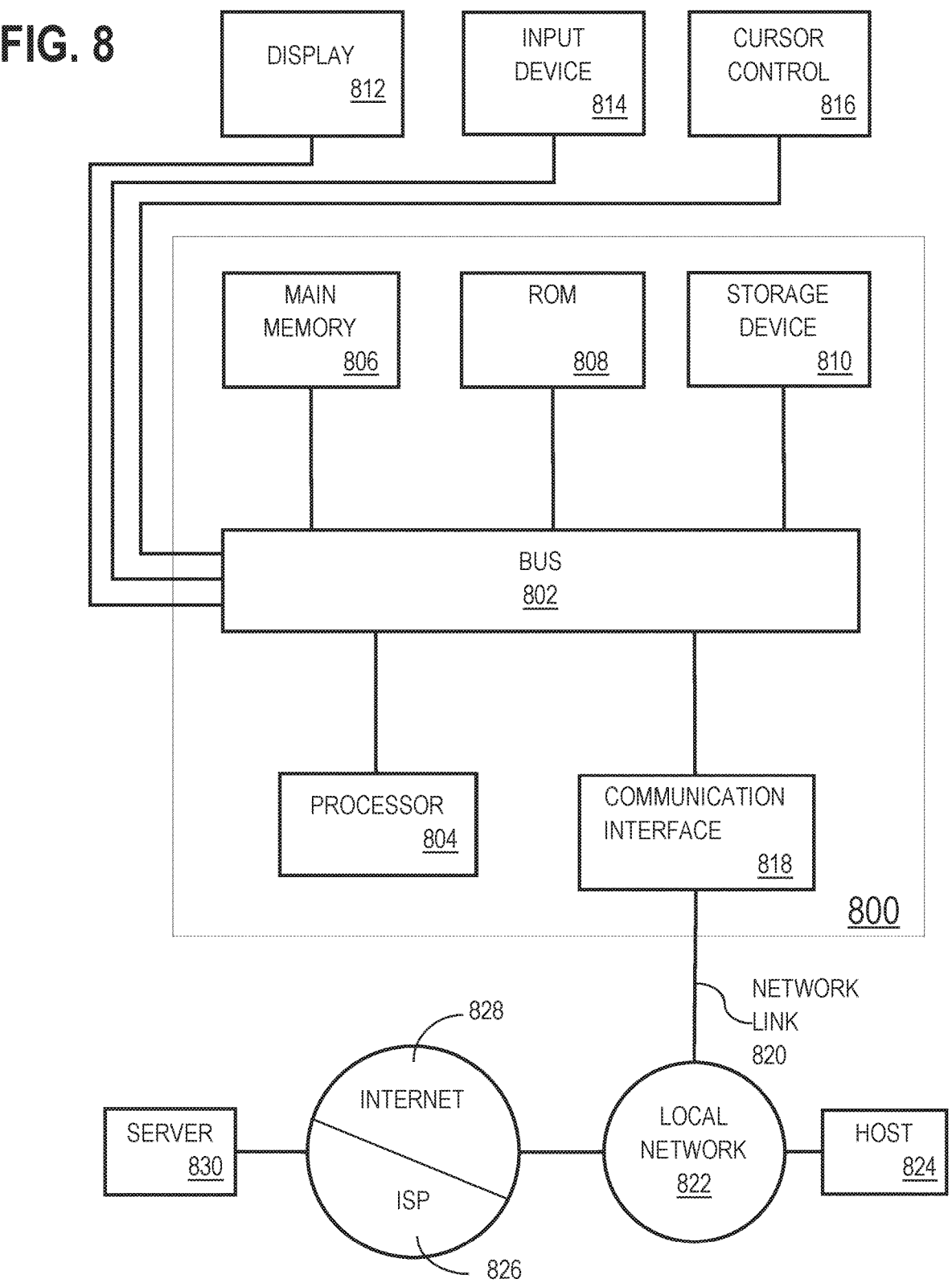
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
receiving, by a first component of a physical topology, a first set of data to be processed;
determining that the first component of the physical topology emulates a second set of components of a virtual topology specified by a virtual topology specification;
wherein the virtual topology specification specifies:
(a) respective sets of one or more functions implemented by a plurality of components of a virtual topology; and
(b) a particular arrangement of the plurality of components of the virtual topology;
determining, based on the virtual topology specification, that a set of one or more functions is implemented by the second set of components of the virtual topology;
processing, by the first component of the physical topology, the set of data to perform the set of functions;
subsequent to processing the set of data to perform the set of functions: modifying the set of data to reflect traversal through the second set of components of the virtual topology, rather than traversal through the first component of the physical topology;
wherein modifying the set of data to reflect traversal through the second set of components of the virtual topology comprises one or more of:
including an identifier of at least one of the second set of components of the virtual topology in the set of data as a source of the modified data;
including identifiers of the second set of components of the virtual topology in the set of data to indicate traversal through the second set of components of the virtual topology;
decreasing a time-to-live (TTL) value associated with the set of data by a count of the second set of components of the virtual topology;
increasing a count of hops traversed by the set of data by the count of the second set of components of the virtual topology;
inserting a timestamp into the set of data to indicate a time at which at least one of the set of functions of the second set of components of the virtual topology was performed;
updating a set of permissions associated with the set of data to indicate that the set of data has been verified by at least one of the second set of components of the virtual topology;
determining, based on the virtual topology specification, that at least one of the second set of components of the virtual topology is connected to a third component of the virtual topology;
determining that a fourth component of the physical topology emulates the third component of the virtual topology;
subsequent to processing the set of data to perform the set of functions and modifying the set of data to reflect traversal through the second set of components of the virtual topology:
routing the set of data to the fourth component of the physical topology.

2. The one or more media of claim 1, wherein:
the virtual topology specification further specifies: respective sets of one or more operations for emulating respective traversals through the plurality of components;
modifying the set of data to reflect traversal through the second set of components of the virtual topology comprises:
determining, based on the virtual topology specification, a set of one or more operations for emulating traversal through the second set of components of the virtual topology;
modifying the set of data according to the set of operations.

3. The one or more media of claim 2, wherein the set of operations comprises at least one of:
decreasing a time-to-live (TTL) value of the set of data;
increasing a hop count of the set of data;
updating an identifier indicating the at least one of the second set of components of the virtual topology as a last component of the virtual topology that processed the data; and
including an identifier of the at least one of the second set of components of the virtual topology into a list of components of the virtual topology traversed by the set of data.

4. The one or more media of claim 3, wherein the set of functions comprises at least one of:
routing or forwarding the set of data to a next hop;
filtering the set of data based on a criterion;
inspecting the set of data for security issues;
hiding or modifying a source address of the set of data;
hiding or modifying a destination address of the set of data;
distributing the set of data to resources based on availability of the resources;
compressing data; and
caching data.

5. The one or more media of claim 1, wherein the virtual topology specification further specifies: one or more forwarding policies that specify reachability between the plurality of components of the virtual topology.

6. The one or more media of claim 1, wherein:
the virtual topology specification further specifies: one or more forwarding policies that determines a next hop for the set of data based on at least one of: a destination prefix associated with the set of data; metadata indicating a port from which the set of data was received; metadata indicating a hash value of a field of the set of data;
determining, based on the virtual topology specification, that the at least one of the second set of components of the virtual topology is connected to the third component of the virtual topology is based on the forwarding policy.

7. The one or more media of claim 1, wherein:
the virtual topology specification further specifies: one or more forwarding policies that specify a filtering criterion for data transmission between the at least one of the second set of components of the virtual topology and the third component of the virtual topology.

8. The one or more media of claim 1, wherein the plurality of components of the virtual topology includes more than three components of the virtual topology.

9. The one or more media of claim 1, wherein the virtual topology specification is specified as a set of code that is readable by the first component of the physical topology.

10. The one or more media of claim 1, wherein modifying the set of data to reflect traversal through the second set of components of the virtual topology, rather than traversal through the first component of the physical topology comprises:
   determining a number of components in the second set of components of the virtual topology;
   modifying the set of data to indicate that the number of components have been traversed.

11. The one or more media of claim 1, wherein determining that the first component of the physical topology emulates the second set of components of the virtual topology specified by the virtual topology specification comprises:
   obtaining a set of one or more mappings between components of the physical topology and components of the virtual topology;
   identifying, from the set of one or more mappings, a mapping between the first component of the physical topology and the second set of components of the virtual topology.

12. The one or more media of claim 11, wherein the set of mappings is generated during instantiation of the virtual topology onto the physical topology.

13. The one or more media of claim 1, wherein routing the set of data to the fourth component of the physical topology comprises:
   encapsulating the set of data using an address associated with the fourth component of the physical topology.

14. The one or more media of claim 1, wherein processing the set of data to perform the set of functions is complete before modifying the set of data to reflect traversal through the second set of components of the virtual topology.

15. The one or more media of claim 1, wherein:
   the virtual topology specification further specifies: respective sets of one or more operations for emulating respective traversals through the plurality of components;
   modifying the set of data to reflect traversal through the second set of components of the virtual topology comprises:
      determining, based on the virtual topology specification, a set of one or more operations for emulating traversal through the second set of components of the virtual topology;
      modifying the set of data according to the set of operations;
   the set of operations comprises at least one of:
      decreasing a time-to-live (TTL) value of the set of data;
      increasing a hop count of the set of data;
      updating an identifier indicating the at least one of the second set of components of the virtual topology as a last component of the virtual topology that processed the data; and
      including an identifier of the at least one of the second set of components of the virtual topology into a list of components of the virtual topology traversed by the set of data;
   the set of functions comprises at least one of:
      routing or forwarding the set of data to a next hop;
      filtering the set of data based on a criterion;
      inspecting the set of data for security issues;
      hiding or modifying a source address of the set of data;
      hiding or modifying a destination address of the set of data;
      distributing the set of data to resources based on availability of the resources;
      compressing data; and
      caching data;
   the virtual topology specification further specifies: one or more forwarding policies;
      wherein the one or more forwarding policies specify reachability between the plurality of components of the virtual topology;
      wherein the one or more forwarding policies that determines a next hop for the set of data based on at least one of: a destination prefix associated with the set of data; metadata indicating a port from which the set of data was received; metadata indicating a hash value of a field of the set of data;
   wherein the one or more forwarding policies that specify a filtering criterion for data transmission between the at least one of the second set of components of the virtual topology and the third component of the virtual topology;
   determining, based on the virtual topology specification, that the at least one of the second set of components of the virtual topology is connected to the third component of the virtual topology is based on the forwarding policy;
   the plurality of components of the virtual topology includes more than three components of the virtual topology;
   the virtual topology specification is specified as a set of code that is readable by the first component of the physical topology;
   modifying the set of data to reflect traversal through the second set of components of the virtual topology, rather than traversal through the first component of the physical topology comprises:
      determining a number of components in the second set of components of the virtual topology;
      modifying the set of data to indicate that the number of components have been traversed;
   determining that the first component of the physical topology emulates the second set of components of the virtual topology specified by the virtual topology specification comprises:
      obtaining a set of one or more mappings between components of the physical topology and components of the virtual topology;
      identifying, from the set of one or more mappings, a mapping between the first component of the physical topology and the second set of components of the virtual topology;
      wherein the set of mappings is generated during instantiation of the virtual topology onto the physical topology;
   processing the set of data to perform the set of functions is complete before modifying the set of data to reflect traversal through the second set of components of the virtual topology.

16. A system, comprising:
   one or more devices, each including at least one hardware processor; and
   the system being configured to perform operations comprising:
   receiving, by a first component of a physical topology, a first set of data to be processed;

determining that the first component of the physical topology emulates a second set of components of a virtual topology specified by a virtual topology specification;

wherein the virtual topology specification specifies:
(a) respective sets of one or more functions implemented by a plurality of components of a virtual topology; and
(b) a particular arrangement of the plurality of components of the virtual topology;

determining, based on the virtual topology specification, that a set of one or more functions is implemented by the second set of components of the virtual topology;

processing, by the first component of the physical topology, the set of data to perform the set of functions;

subsequent to processing the set of data to perform the set of functions: modifying the set of data to reflect traversal through the second set of components of the virtual topology, rather than traversal through the first component of the physical topology;

wherein modifying the set of data to reflect traversal through the second set of components of the virtual topology comprises one or more of:
including an identifier of at least one of the second set of components of the virtual topology in the set of data as a source of the modified data;
including identifiers of the second set of components of the virtual topology in the set of data to indicate traversal through the second set of components of the virtual topology;
decreasing a time-to-live (TTL) value associated with the set of data by a count of the second set of components of the virtual topology;
increasing a count of hops traversed by the set of data by the count of the second set of components of the virtual topology;
inserting a timestamp into the set of data to indicate a time at which at least one of the set of functions of the second set of components of the virtual topology was performed;
updating a set of permissions associated with the set of data to indicate that the set of data has been verified by at least one of the second set of components of the virtual topology;

determining, based on the virtual topology specification, that at least one of the second set of components of the virtual topology is connected to a third component of the virtual topology;

determining that a fourth component of the physical topology emulates the third component of the virtual topology;

subsequent to processing the set of data to perform the set of functions and modifying the set of data to reflect traversal through the second set of components of the virtual topology:
routing the set of data to the fourth component of the physical topology.

17. The system of claim 16, wherein:
the virtual topology specification further specifies: respective sets of one or more operations for emulating respective traversals through the plurality of components;
modifying the set of data to reflect traversal through the second set of components of the virtual topology comprises:
determining, based on the virtual topology specification, a set of one or more operations for emulating traversal through the second set of components of the virtual topology;
modifying the set of data according to the set of operations.

18. The system of claim 17, wherein the set of operations comprises at least one of:
decreasing a time-to-live (TTL) value of the set of data;
increasing a hop count of the set of data;
updating an identifier indicating the at least one of the second set of components of the virtual topology as a last component of the virtual topology that processed the data; and
including an identifier of the at least one of the second set of components of the virtual topology into a list of components of the virtual topology traversed by the set of data.

19. A method, comprising:
receiving, by a first component of a physical topology, a first set of data to be processed;
determining that the first component of the physical topology emulates a second set of components of a virtual topology specified by a virtual topology specification;
wherein the virtual topology specification specifies:
(a) respective sets of one or more functions implemented by a plurality of components of a virtual topology; and
(b) a particular arrangement of the plurality of components of the virtual topology;
determining, based on the virtual topology specification, that a set of one or more functions is implemented by the second set of components of the virtual topology;
processing, by the first component of the physical topology, the set of data to perform the set of functions;
subsequent to processing the set of data to perform the set of functions: modifying the set of data to reflect traversal through the second set of components of the virtual topology, rather than traversal through the first component of the physical topology;
wherein modifying the set of data to reflect traversal through the second set of components of the virtual topology comprises one or more of:
including an identifier of at least one of the second set of components of the virtual topology in the set of data as a source of the modified data;
including identifiers of the second set of components of the virtual topology in the set of data to indicate traversal through the second set of components of the virtual topology;
decreasing a time-to-live (TTL) value associated with the set of data by a count of the second set of components of the virtual topology;
increasing a count of hops traversed by the set of data by the count of the second set of components of the virtual topology;
inserting a timestamp into the set of data to indicate a time at which at least one of the set of functions of the second set of components of the virtual topology was performed;
updating a set of permissions associated with the set of data to indicate that the set of data has been verified by at least one of the second set of components of the virtual topology;

determining, based on the virtual topology specification, that at least one of the second set of components of the virtual topology is connected to a third component of the virtual topology;

determining that a fourth component of the physical topology emulates the third component of the virtual topology;

subsequent to processing the set of data to perform the set of functions and modifying the set of data to reflect traversal through the second set of components of the virtual topology:
routing the set of data to the fourth component of the physical topology;

wherein the method is performed by one or more devices, each including at least one hardware processor.

20. The method of claim 19, wherein:

the virtual topology specification further specifies: respective sets of one or more operations for emulating respective traversals through the plurality of components;

modifying the set of data to reflect traversal through the second set of components of the virtual topology comprises:
determining, based on the virtual topology specification, a set of one or more operations for emulating traversal through the second set of components of the virtual topology;
modifying the set of data according to the set of operations.

* * * * *